US010538357B2

(12) United States Patent
Lane et al.

(10) Patent No.: US 10,538,357 B2
(45) Date of Patent: *Jan. 21, 2020

(54) LIGHTWEIGHT CONTAINER BASE

(71) Applicant: Amcor Rigid Plastics USA, LLC, Wilmington, DE (US)

(72) Inventors: Michael T. Lane, Brooklyn, MI (US); Walt Paegel, Jackson, MI (US); Peidong Han, Saline, MI (US)

(73) Assignee: AMCOR RIGID PLASTICS USA, LLC, Wilmington, DE (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/581,855

(22) Filed: Apr. 28, 2017

(65) Prior Publication Data

US 2017/0283108 A1    Oct. 5, 2017

Related U.S. Application Data

(63) Continuation-in-part of application No. 14/465,494, filed on Aug. 21, 2014, now Pat. No. 9,694,930.
(Continued)

(51) Int. Cl.
*B65D 1/42* (2006.01)
*B65D 1/02* (2006.01)
(Continued)

(52) U.S. Cl.
CPC ......... *B65D 1/0284* (2013.01); *B65D 1/0223* (2013.01); *B65D 1/0246* (2013.01);
(Continued)

(58) Field of Classification Search
CPC .. B65D 79/005; B65D 1/0246; B65D 1/0223; B65D 1/0284
(Continued)

(56) References Cited

U.S. PATENT DOCUMENTS

| 97,922 A | 12/1869 | Houghton et al. |
| 278,205 A | 5/1883 | Weiss et al. |

(Continued)

FOREIGN PATENT DOCUMENTS

| CO | 6890084 A2 | 3/2014 |
| EP | 2163483 A1 | 3/2010 |

(Continued)

OTHER PUBLICATIONS

International Search Report and Written Opinion dated Feb. 14, 2013 in corresponding international patent application Serial No. PCT/US2012/053367 (nine pages).

(Continued)

*Primary Examiner* — Sue A Weaver
(74) *Attorney, Agent, or Firm* — Harness, Dickey & Pierce, P.L.C.

(57) ABSTRACT

A container defining a longitudinal axis and a transverse direction that is transverse with respect to the longitudinal axis. The container includes a finish and a sidewall portion extending from the finish. A plurality of ribs are defined by the sidewall. A base portion extends from the sidewall portion and encloses the sidewall portion to form a volume therein for retaining a commodity. The base portion has a contact surface for supporting the container. A plurality of straps extend radially along the base portion away from the longitudinal axis in the transverse direction, each one of the straps defines a strap surface that is closer to the finish than the contact surface. The plurality of ribs and the base portion are configured to place the container in a state of hydraulic charge-up when top load is applied to the container after the container is filled.

8 Claims, 32 Drawing Sheets

Related U.S. Application Data which is a continuation-in-part of application No. PCT/US2013/057709, filed on Aug. 30, 2013, which is a continuation-in-part of application No. PCT/US2012/053367, filed on Aug. 31, 2012.

(60) Provisional application No. 61/529,285, filed on Aug. 31, 2011.

(51) Int. Cl.
  *B65D 79/00* (2006.01)
  *B29L 31/00* (2006.01)
  *B29K 67/00* (2006.01)
  *B29C 49/06* (2006.01)

(52) U.S. Cl.
  CPC ............ *B65D 79/005* (2013.01); *B29C 49/06* (2013.01); *B29K 2067/003* (2013.01); *B29L 2031/7158* (2013.01); *B65D 2501/0036* (2013.01)

(58) Field of Classification Search
  USPC .......................................................... 215/375
  See application file for complete search history.

(56) References Cited

U.S. PATENT DOCUMENTS

| | | | |
|---|---|---|---|
| 3,727,783 A | 4/1973 | Carmichael | |
| 4,054,219 A | 10/1977 | Young et al. | |
| 4,892,205 A | 1/1990 | Powers et al. | |
| 4,978,015 A | 12/1990 | Walker | |
| 5,024,340 A | 6/1991 | Alberghini et al. | |
| 5,080,244 A | 1/1992 | Yoshino | |
| D332,747 S | 1/1993 | Darr et al. | |
| 5,507,402 A | 4/1996 | Clark | |
| 6,019,236 A * | 2/2000 | Slat ................. | B65D 1/0284 215/375 |
| 6,857,531 B2 | 2/2005 | Slat et al. | |
| 8,469,214 B2 | 6/2013 | Boukobza | |
| 8,524,349 B2 | 9/2013 | Protais et al. | |
| 9,387,971 B2 | 7/2016 | Melrose | |
| 9,422,076 B2 * | 8/2016 | Lane ................. | B29C 49/0005 |
| 9,694,930 B2 * | 7/2017 | Lane ................. | B29C 49/0005 |
| 2002/0153343 A1 | 10/2002 | Tobias et al. | |
| 2003/0196926 A1 | 10/2003 | Tobias et al. | |
| 2004/0094502 A1 | 5/2004 | Boukobza | |
| 2004/0173565 A1 | 9/2004 | Semersky et al. | |
| 2009/0159556 A1 | 6/2009 | Patcheak et al. | |
| 2009/0178996 A1 | 7/2009 | Trude et al. | |
| 2010/0072165 A1 | 3/2010 | Schau | |
| 2010/0326950 A1 | 12/2010 | Lane | |
| 2011/0011873 A1 | 1/2011 | Miura et al. | |
| 2011/0017700 A1 | 1/2011 | Patcheak et al. | |
| 2011/0049083 A1 | 3/2011 | Scott et al. | |
| 2014/0197127 A1 | 7/2014 | Lane et al. | |
| 2015/0144587 A1 | 5/2015 | Hanan | |
| 2015/0225109 A1 | 8/2015 | Lane et al. | |
| 2016/0297558 A1 * | 10/2016 | Strasser ............... | B65D 1/0284 |

FOREIGN PATENT DOCUMENTS

| | | |
|---|---|---|
| EP | 2653400 A1 | 10/2013 |
| JP | H0577834 A | 3/1993 |
| JP | 2000-079927 A | 3/2000 |

OTHER PUBLICATIONS

International Search Report and Written Opinion dated Dec. 2, 2013 in corresponding international patent application Serial No. PCT/US2013/057708 (sixteen pages).

Resolution No. 25808 dated May 15, 2017 in corresponding Colombian Patent Application 15053037 (7 pages).

International Search Report and Written Opinion dated Jan. 24, 2018 in corresponding international patent application Serial No. PCT/US2017/061342.

Supplementary European Search Report dated Feb. 26, 2018 issued in corresponding European Patent Application No. 15833585.1.

Colombian Office Action dated Aug. 9, 2018 in corresponding Colombian Patent Application No. NC20170001749 (12 pages).

European Communication issued in corresponding European Patent Application No. 158335851 dated Jan. 30, 2019.

\* cited by examiner

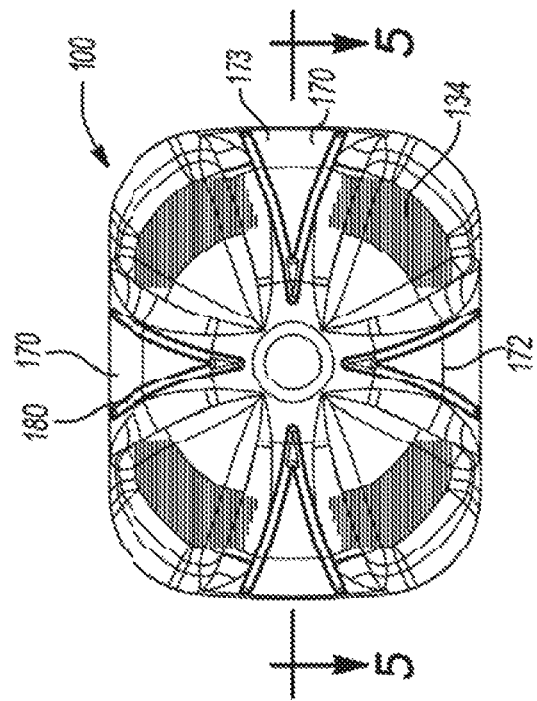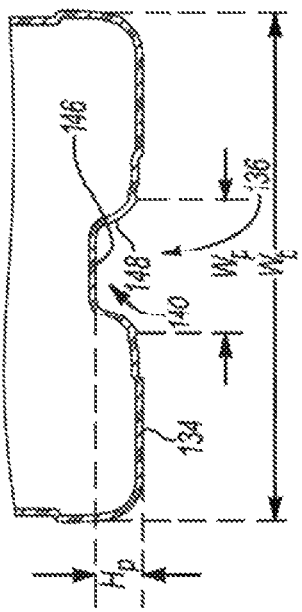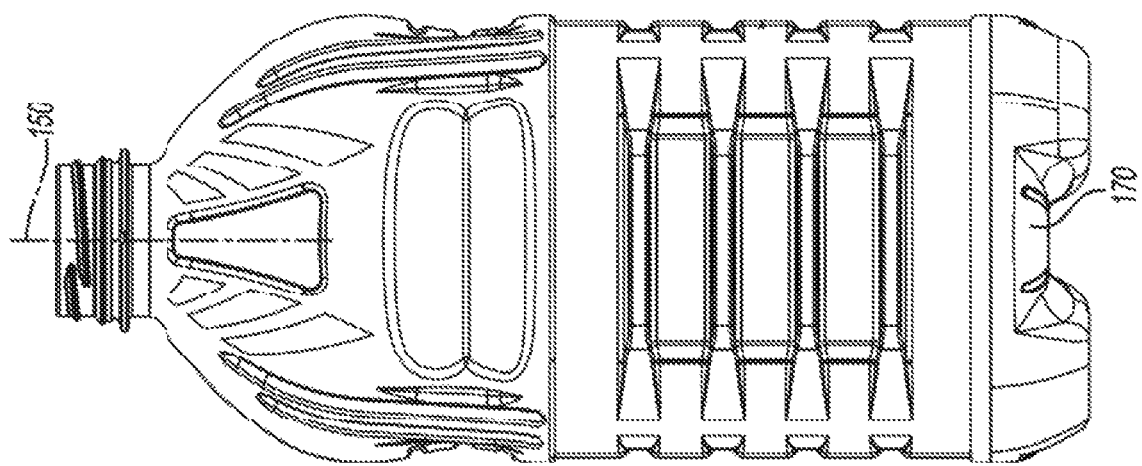

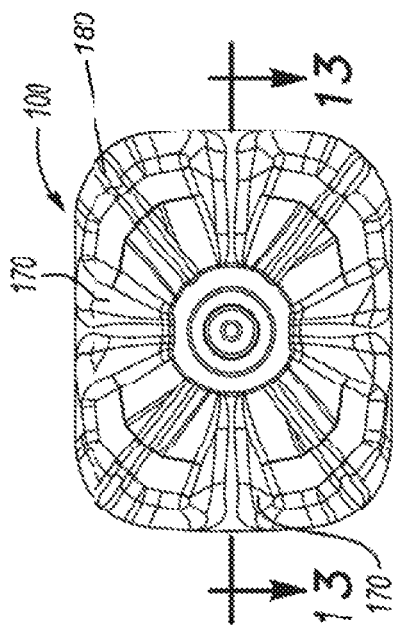
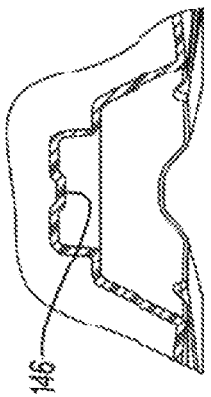
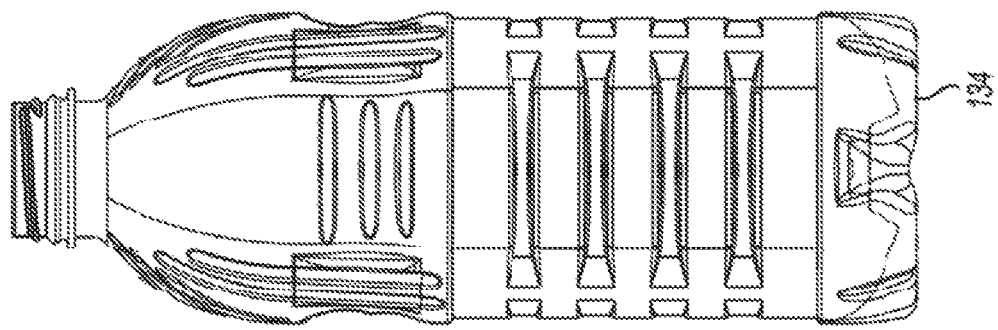
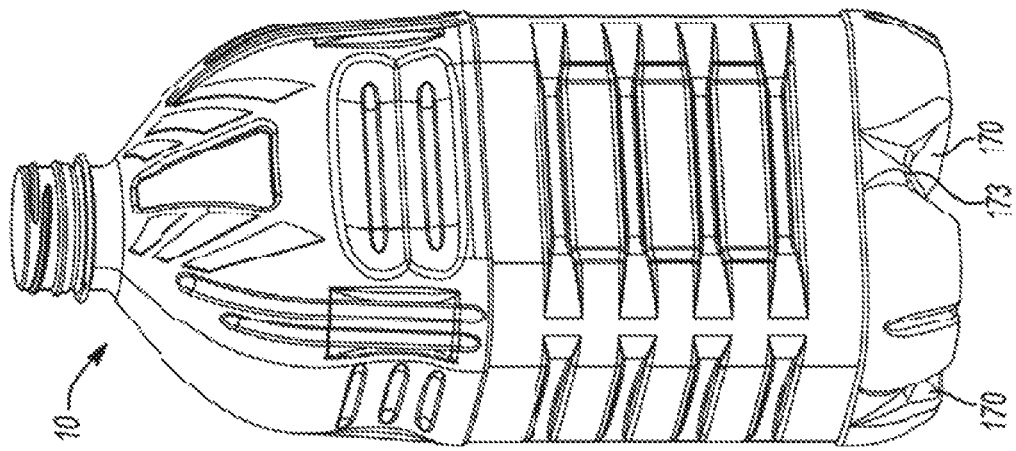

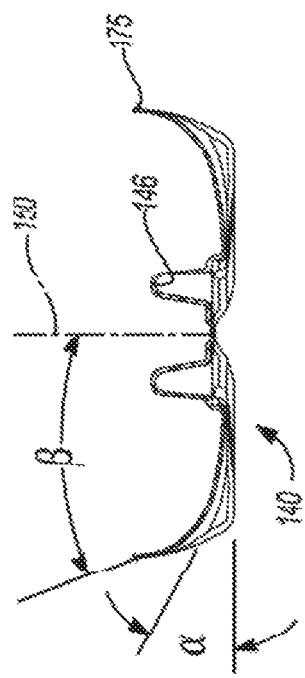
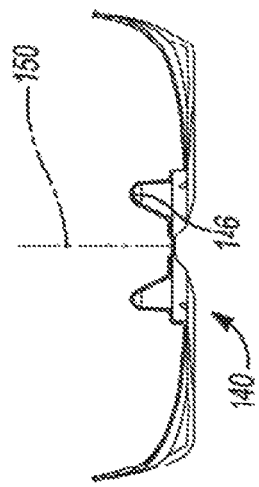
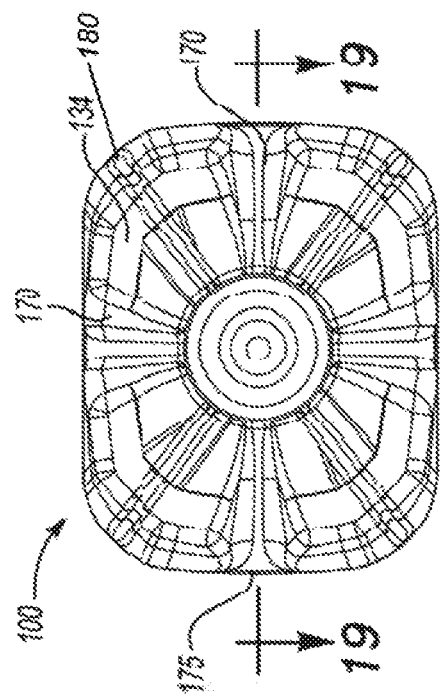
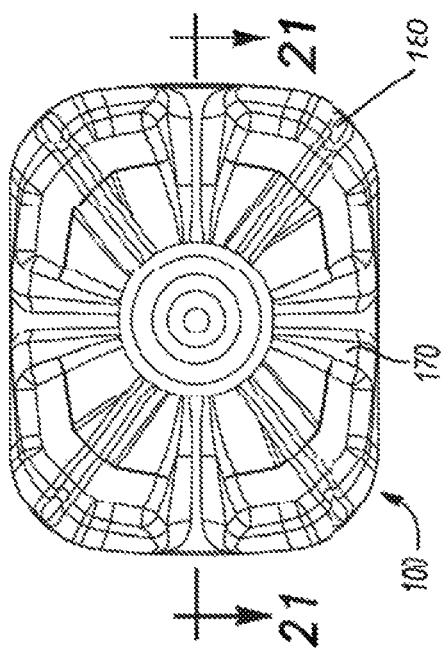

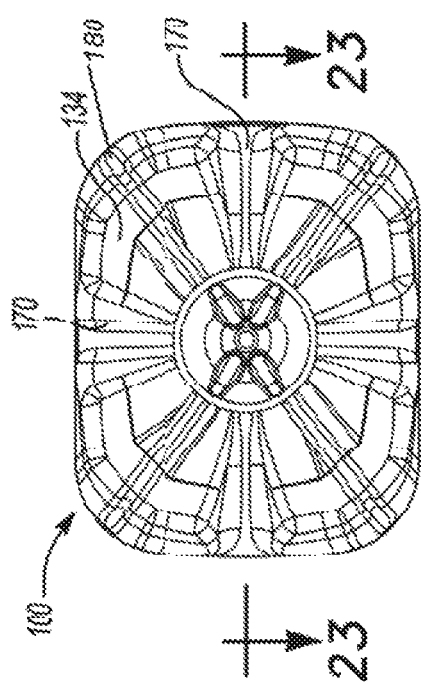
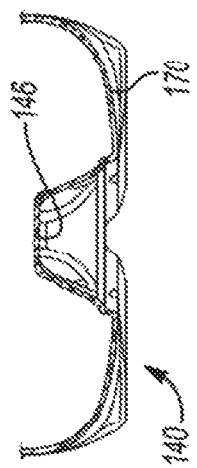
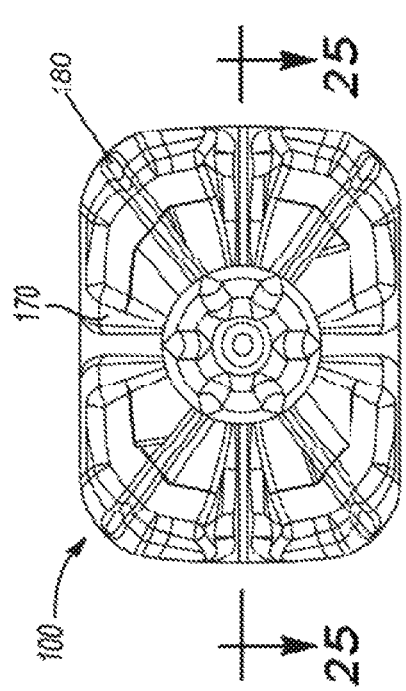
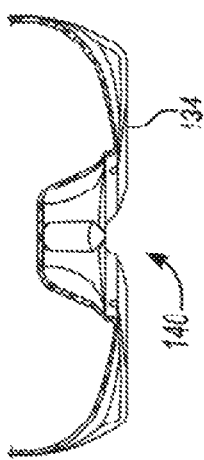

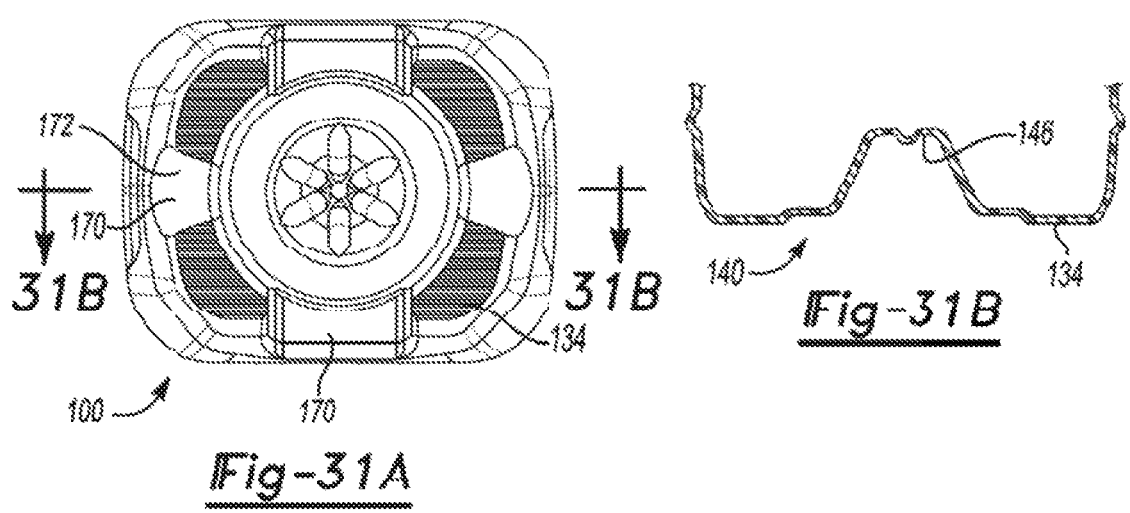
Fig-31A
Fig-31B
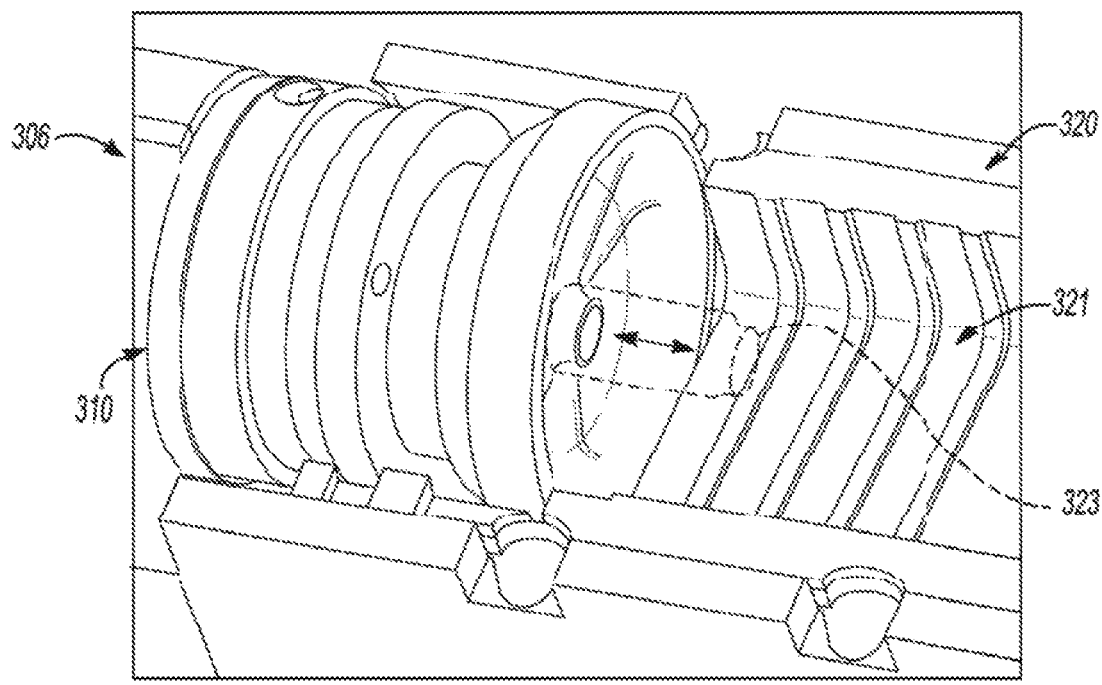
Fig-32

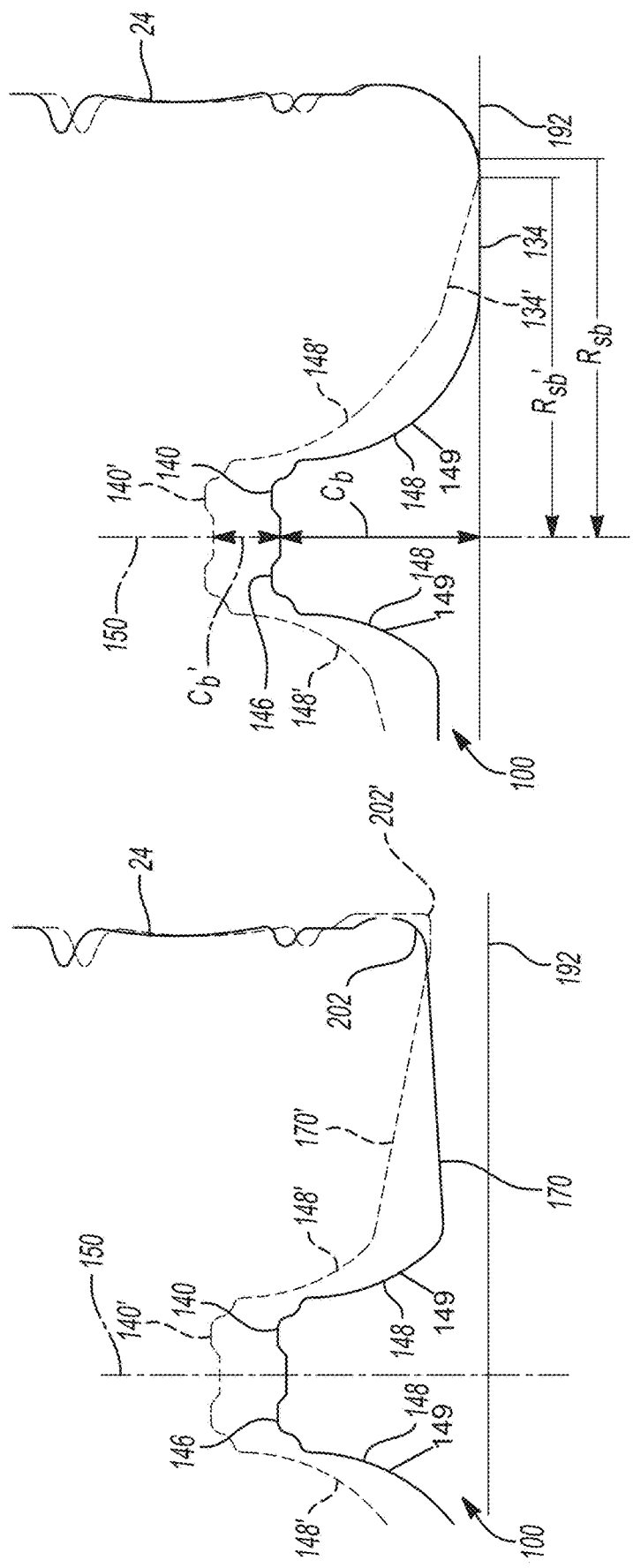

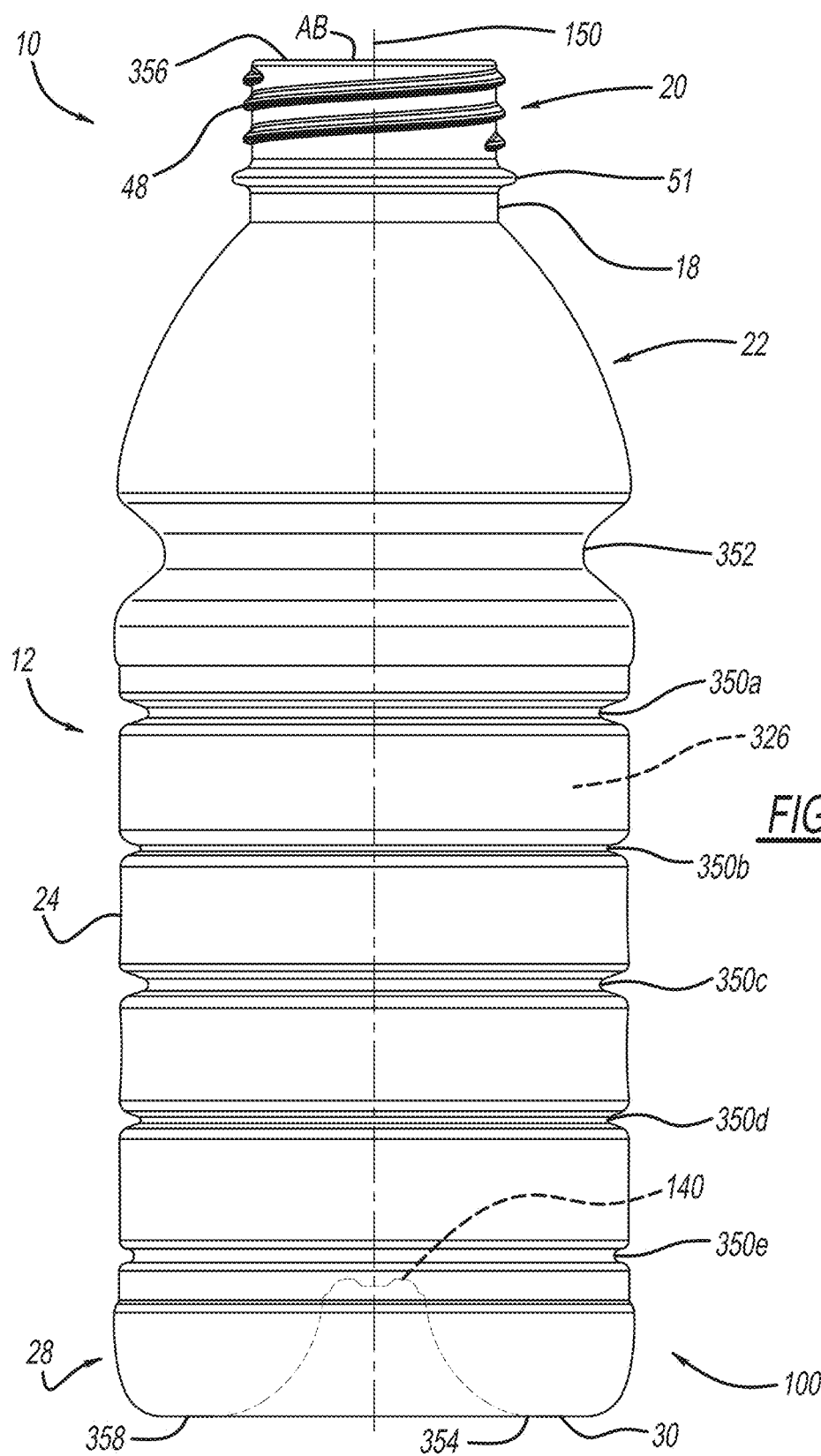

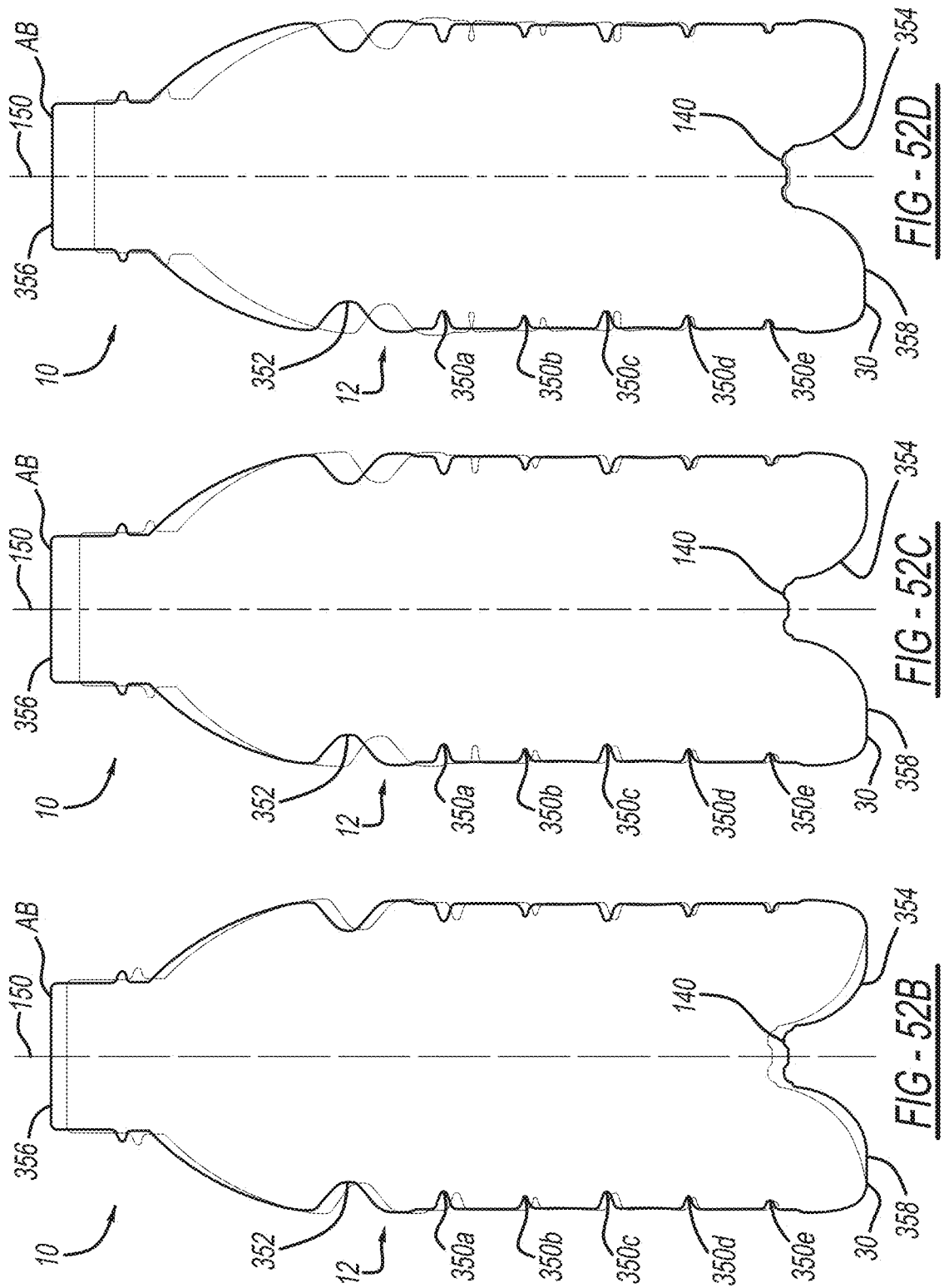

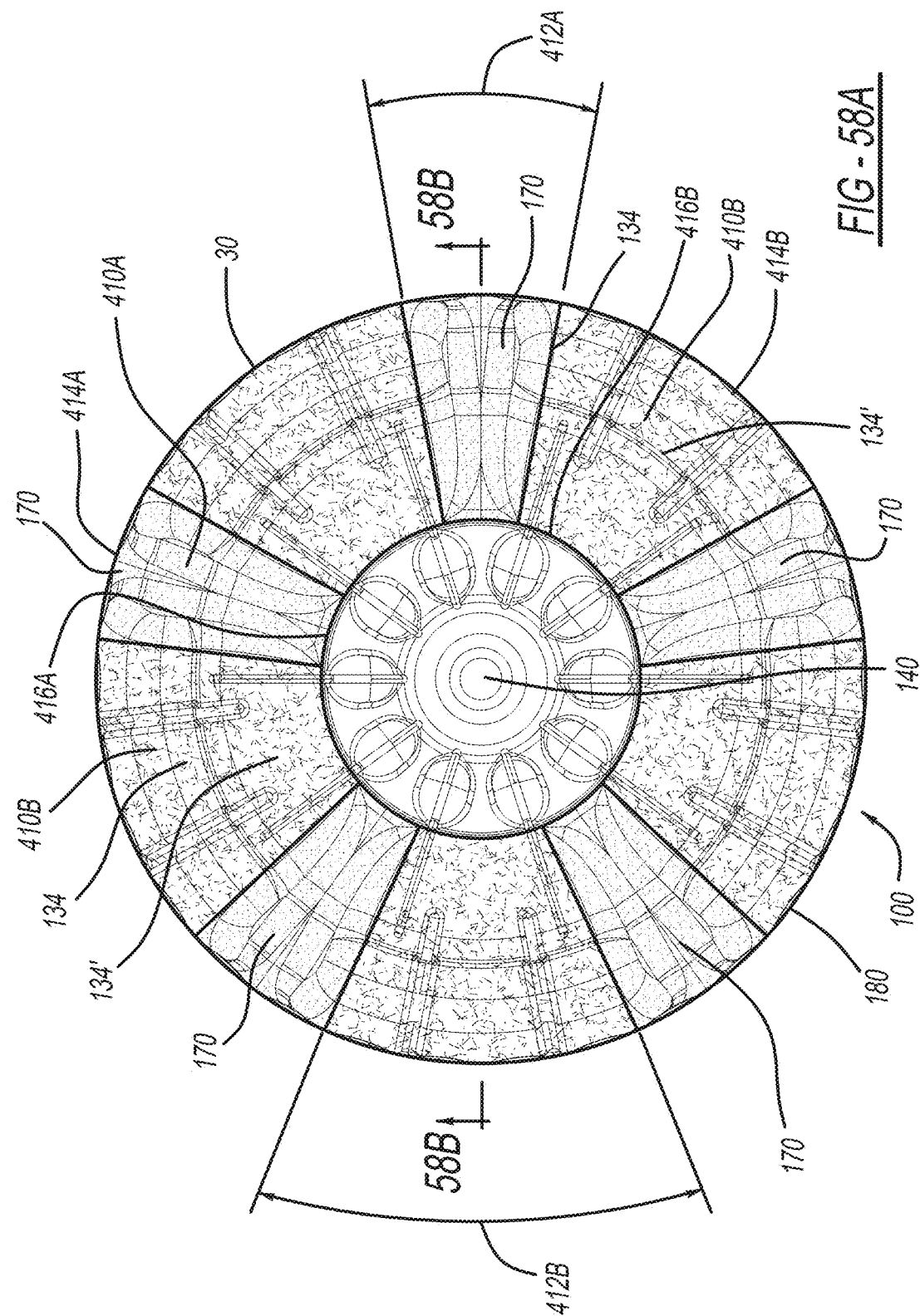

| Total Projected Area | | | |
|---|---|---|---|
| Container Size | Strap | Foot | Foot/Strap |
| 20ozRnd | 11.7000 | 23.8000 | 2.0 |
| 64ozRec | 27.5000 | 56.5000 | 2.1 |
| 64ozRnd | 15.6000 | 74.7000 | 4.8 |
| 32ozRnd | 12.8000 | 37.7000 | 2.9 |
| 46ozRnd | 23.3000 | 52.1000 | 2.2 |

*FIG - 60A*

| Axial Strap To Foot Angle Relationship | | | |
|---|---|---|---|
| Container Size | Foot | Strap | Delta |
| 20ozRnd | -15 | 5 | 20 |
| 64ozRec | -5 | 7 | 12 |
| 64ozRnd | -4 | 8 | 12 |
| 32ozRnd | -4 | 23 | 27 |
| 46ozRnd | -15 | 9 | 24 |

*FIG - 60B*

| Radial Strap To Foot Angle Relationship | | | |
|---|---|---|---|
| Container Size | Strap | Foot | Foot/Strap |
| 20ozRnd | 120 | 240 | 2.0 |
| 64ozRec | 198 | 160 | 0.8 |
| 64ozRnd | 60 | 297.5 | 5.0 |
| 32ozRnd | 90 | 267.5 | 3.0 |
| 46ozRnd | 110 | 247.5 | 2.3 |

*FIG - 60C*

| Perimeter Relationship |||||
|---|---|---|---|---|
| Container Size | side | Strap | Foot | Foot/Strap |
| 20ozRnd | inner | 31 | 63 | 2.0 |
|  | outer | 76 | 155 | 2.0 |
| 64ozRec | inner | 37 | 95 | 2.6 |
|  | outer | 147 | 218 | 1.5 |
| 64ozRnd | inner | 25.48 | 63.49 | 2.5 |
|  | outer | 304.37 | 112.17 | 0.4 |
| 32ozRnd | inner | 34.1 | 100.8 | 3.0 |
|  | outer | 72.2 | 213.4 | 3.0 |
| 46ozRnd | inner | 41.7 | 93.4 | 2.2 |
|  | outer | 103.78 | 232.3 | 2.2 |

FIG - 60D

| Pushup to Major Diameter Relationship ||||
|---|---|---|---|
| Container Size | pushup diam | outer diameter | ratio |
| 20ozRnd | 29.94 | 73.65 | 41% |
| 64ozRec | 43.33 | 115.02 | 38% |
| 64ozRnd | 47 | 117.09 | 40% |
| 32ozRnd | 42.96 | 93.98 | 46% |
| 46ozRnd | 43 | 106.98 | 40% |

FIG - 60E

LIGHTWEIGHT CONTAINER BASE

CROSS-REFERENCE TO RELATED APPLICATIONS

This application is a continuation-in-part of U.S. patent application Ser. No. 14/465,494 filed Aug. 21, 2014 (issued as U.S. Pat. No. 9,694,930 on Jun. 14, 2017), which is a continuation-in-part of PCT International Application No. PCT/US2013/057709 filed Aug. 30, 2013, which is a continuation-in-part of PCT International Application No. PCT/US2012/053367 filed Aug. 31, 2012, which claims the benefit of U.S. Provisional Application No. 61/529,285, filed on Aug. 31, 2011. The entire disclosures of each of the above-referenced applications are incorporated herein by reference.

FIELD

This disclosure generally relates to containers for retaining a commodity, such as a solid or liquid commodity. More specifically, this disclosure relates to a container having an optimized base design to provide a balanced vacuum and pressure response, while minimizing container weight.

BACKGROUND

This section provides background information related to the present disclosure which is not necessarily prior art. This section also provides a general summary of the disclosure, and is not a comprehensive disclosure of its full scope or all of its features.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Unfortunately, with some applications, as PET containers for hot fill applications become lighter in material weight (aka container gram weight), it becomes increasingly difficult to create functional designs that can simultaneously resist fill pressures, absorb vacuum pressures, and withstand top loading forces. According to the principles of the present teachings, the problem of expansion under the pressure caused by the hot fill process is improved by creating unique vacuum/label panel geometry that resists expansion, maintains shape, and shrinks back to approximately the original starting volume due to vacuum generated during the product cooling phase.

Further areas of applicability will become apparent from the description provided herein. The description and specific examples in this summary are intended for purposes of illustration only and are not intended to limit the scope of the present disclosure.

SUMMARY

The present teachings provide for a container defining a longitudinal axis and a transverse direction that is transverse with respect to the longitudinal axis. The container includes a finish and a sidewall portion extending from the finish. A plurality of ribs are defined by the sidewall portion. A base portion extends from the sidewall portion and encloses the sidewall portion to form a volume therein for retaining a commodity. The base portion has a contact surface for supporting the container. A plurality of straps extend radially along the base portion away from the longitudinal axis in the transverse direction, each one of the straps defines a strap surface that is closer to the finish than the contact surface. The plurality of ribs and the base portion are configured to place the container in a state of hydraulic charge-up when top load is applied to the container after the container is filled.

The present teachings also provide for a container defining a longitudinal axis and a transverse direction that is transverse with respect to the longitudinal axis. The container includes a finish, a sidewall portion, a base portion, a plurality of straps, a plurality of rib members, and a central portion. The sidewall portion extends from the finish. A plurality of horizontal side ribs are defined by the sidewall. The base portion extends from the sidewall portion and encloses the sidewall portion to form a volume therein for retaining a commodity. The base portion has a contact surface for supporting the container. The plurality of straps extend radially along the base portion away from the longitudinal axis in the transverse direction. Each one of the straps defines a strap surface that is closer to the finish than the contact surface. The plurality of base rib members are recessed within the base portion. Each one of the plurality of base rib members is between two of the plurality of straps. A central pushup portion is at an axial center of the base portion. The longitudinal axis extends through the central pushup portion. The plurality of horizontal side ribs and the base portion are configured to place the container in a state of hydraulic charge-up when top load is applied to the container after the container is filled.

The present teachings further provide for a container defining a longitudinal axis and a transverse direction that is transverse with respect to the longitudinal axis. The container includes a finish, a sidewall portion, a base portion, a plurality of straps, a plurality of rib members, and a central pushup portion. The sidewall portion extends from the finish. A plurality of horizontal side ribs are defined by the sidewall portion. The base portion extends from the sidewall portion and encloses the sidewall portion to form a volume therein for retaining a commodity. The base portion has a contact surface for supporting the container. The plurality of straps extend radially along the base portion away from the longitudinal axis in the transverse direction. Each one of the straps defines a strap surface that is closer to the finish than the contact surface. A plurality of base rib members are recessed within the base portion. Each one of the plurality of base rib members is between two of the plurality of straps. The central pushup portion is at an axial center of the base portion. The longitudinal axis extends through the central pushup portion. Each one of the plurality of straps is at least partially aligned with one of the base rib members in the transverse direction on opposite sides of the longitudinal axis. The plurality of horizontal side ribs and the base portion are configured to place the container in a state of hydraulic charge-up when top load is applied to the container after the container is filled. The plurality of horizontal side ribs collapse upon application of top load, and movement of the base portion is constrained by a standing surface, thereby causing fluid within the volume of the container to reach an incompressible state and resist deformation of the container.

DRAWINGS

The drawings described herein are for illustrative purposes only of selected embodiments and not all possible implementations, and are not intended to limit the scope of the present disclosure.

Figure 42:
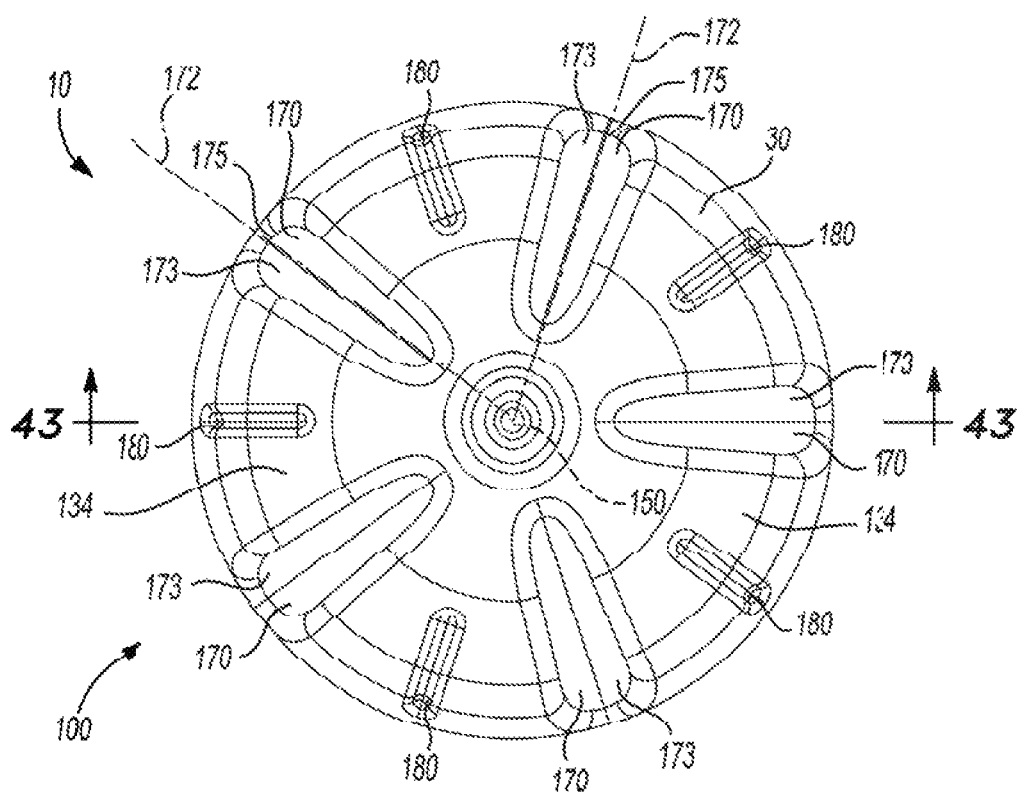
Figure 43:
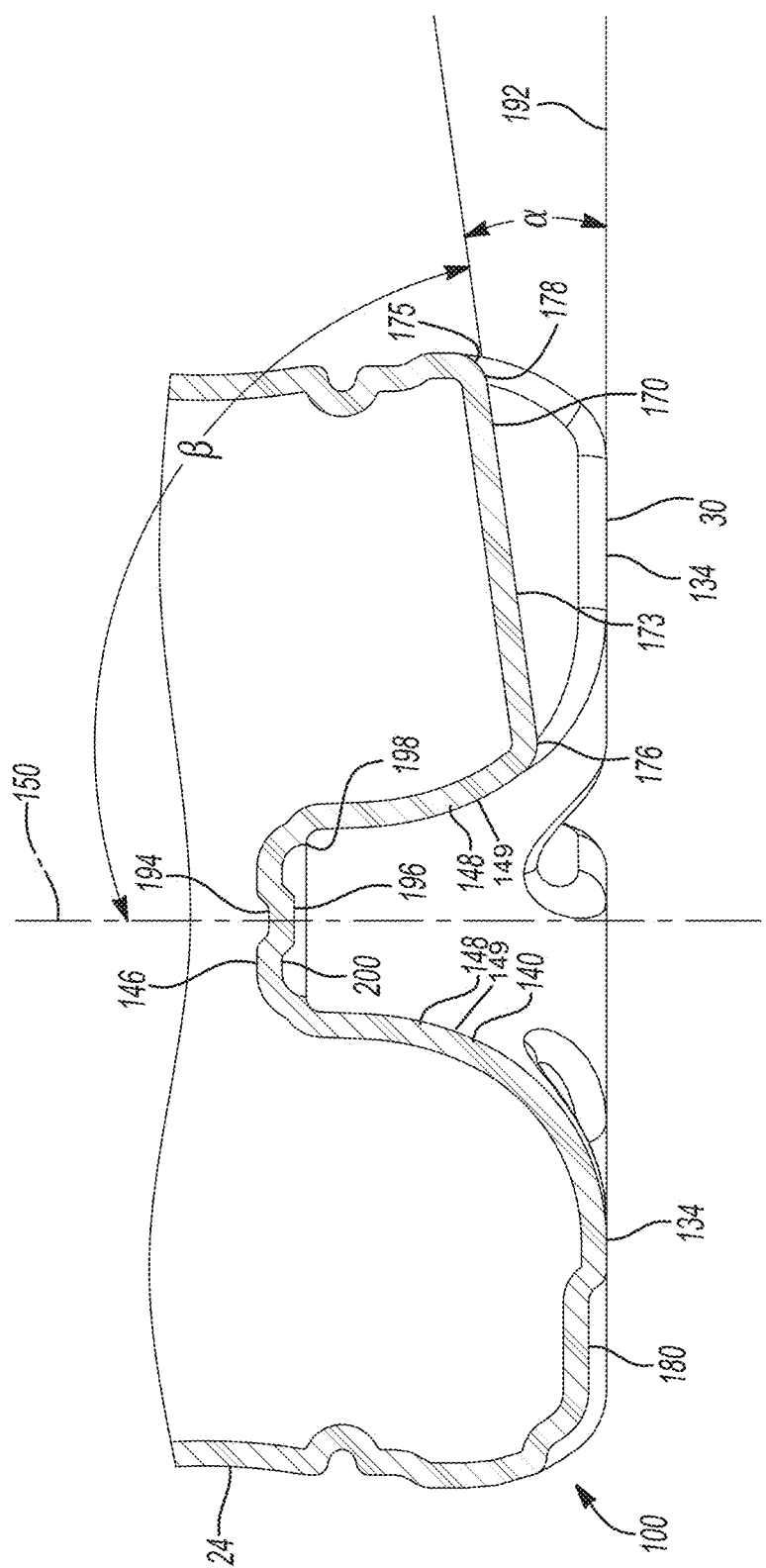

FIGS. 1-5 are views illustrating exemplary embodiments of a container with various features of the present teachings, wherein FIG. 1 is a perspective view, FIG. 2 is a side view, FIG. 3 is a front view, FIG. 4 is a bottom view, and FIG. 5 is a section view taken along the line 5-5 of FIG. 4;

FIGS. 6-9 are views illustrating additional exemplary embodiments of a container with various features of the present teachings, wherein FIG. 6 is a perspective view, FIG. 7 is a side view, FIG. 8 is a bottom view, and FIG. 9 is a section view taken along the line 9-9 of FIG. 8;

FIGS. 10-13 are views illustrating additional exemplary embodiments of a container with various features of the present teachings, wherein FIG. 10 is a perspective view, FIG. 11 is a side view, FIG. 12 is a bottom view, and FIG. 13 is a section view taken along the line 13-13 of FIG. 12;

FIGS. 14-17 are views illustrating additional exemplary embodiments of a container with various features of the present teachings, wherein FIG. 14 is a perspective view, FIG. 15 is a side view, FIG. 16 is a bottom view, and FIG. 17 is a section view taken along the line 17-17 of FIG. 16;

FIGS. 18 and 19 are views illustrating additional exemplary embodiments of a container with various features of the present teachings, wherein FIG. 18 is a bottom view and FIG. 19 is a section view taken along the line 19-19 of FIG. 18;

FIGS. 20 and 21 are views illustrating additional exemplary embodiments of a container with various features of the present teachings, wherein FIG. 20 is a bottom view and FIG. 21 is a section view taken along the line 21-21 of FIG. 20;

FIGS. 22 and 23 are views illustrating additional exemplary embodiments of a container with various features of the present teachings, wherein FIG. 22 is a bottom view and FIG. 23 is a section view taken along the line 23-23 of FIG. 22;

FIGS. 24 and 25 are views illustrating additional exemplary embodiments of a container with various features of the present teachings, wherein FIG. 24 is a bottom view and FIG. 25 is a section view taken along the line 25-25 of FIG. 24;

FIGS. 31A and 31B are views of additional exemplary embodiments of a container according to the present teachings, wherein FIG. 31A is a bottom view and FIG. 31B is a section view taken along the line 31B-31B of FIG. 31A;

FIG. 32 is a perspective view of a mold system suitable for molding the container of the present disclosure;

FIGS. 40-45 are views illustrating additional exemplary embodiments of a container with various features of the present teachings, wherein FIG. 40 is a side view, FIG. 41 is a perspective view, FIG. 42 is a bottom view, FIG. 43 is a section view taken along line 43-43 of FIG. 42, and FIGS. 44 and 45 are schematics of a base on the container;

Figure 46:
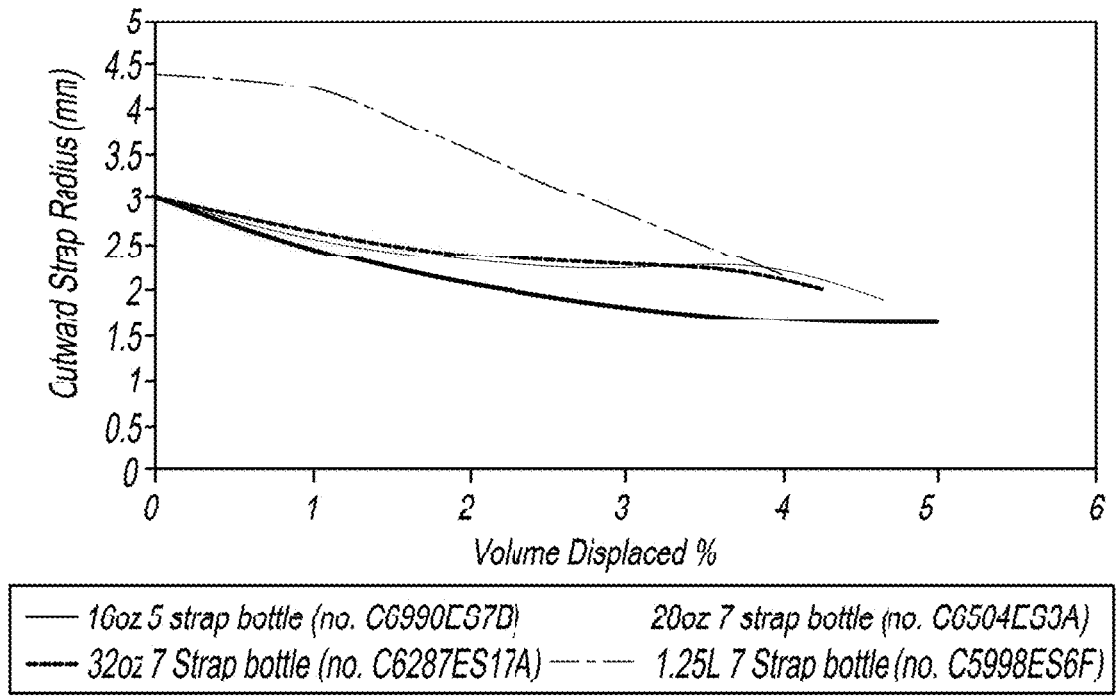
Figure 47:
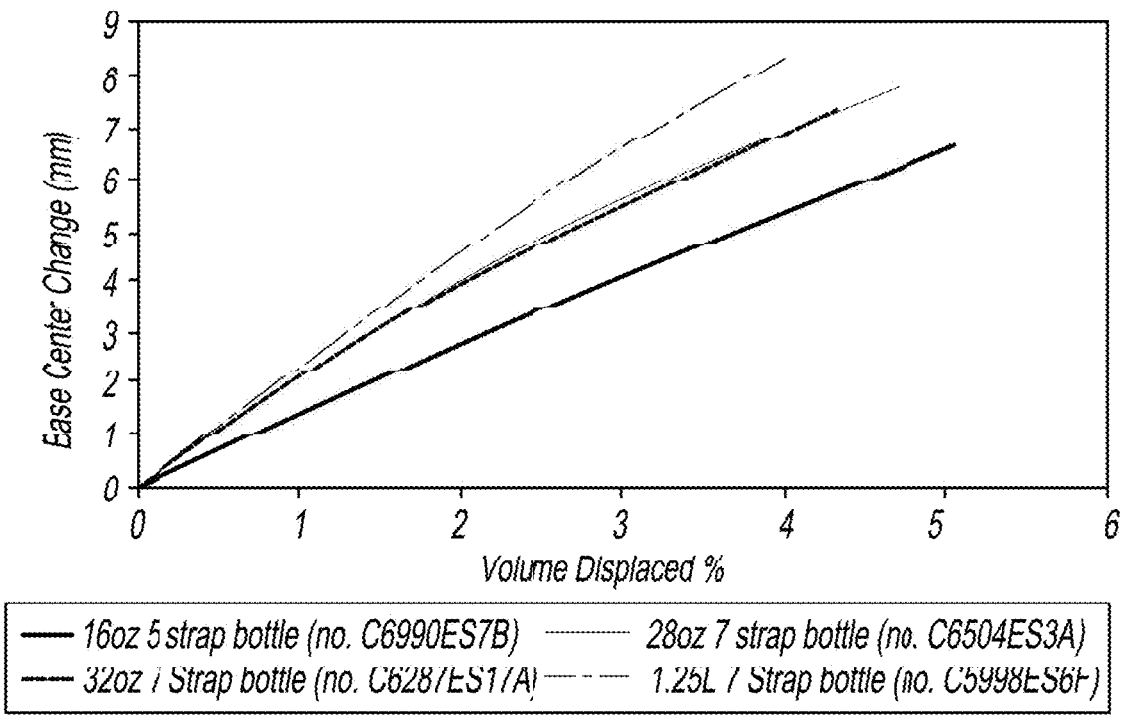
Figure 48:
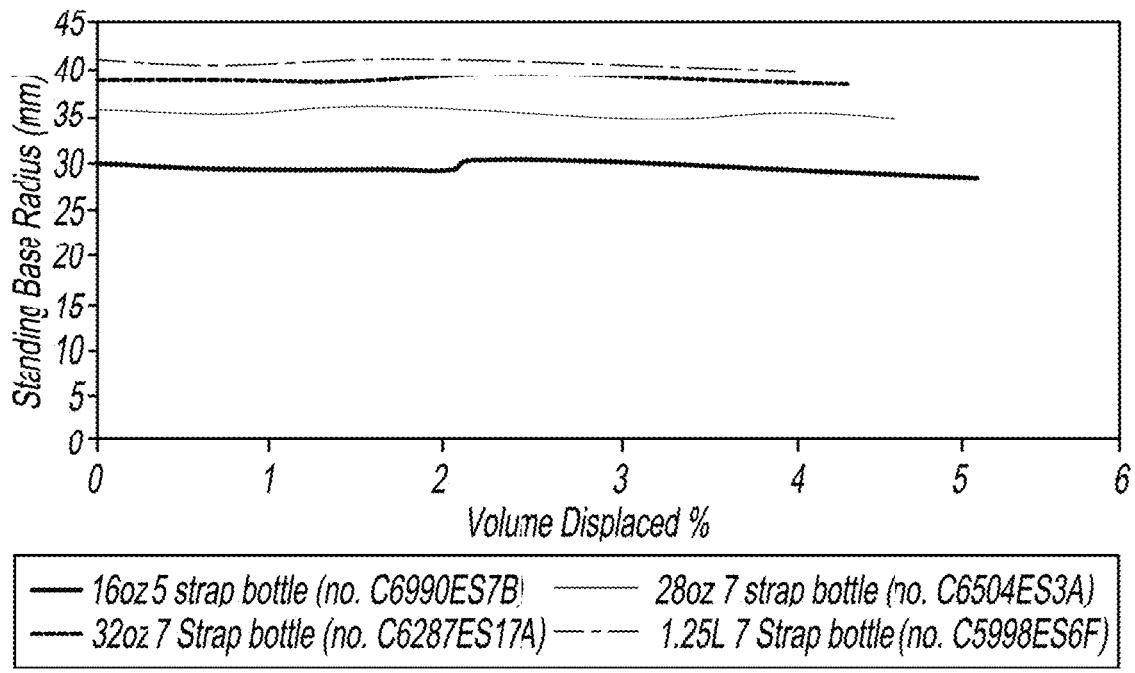
Figure 49:
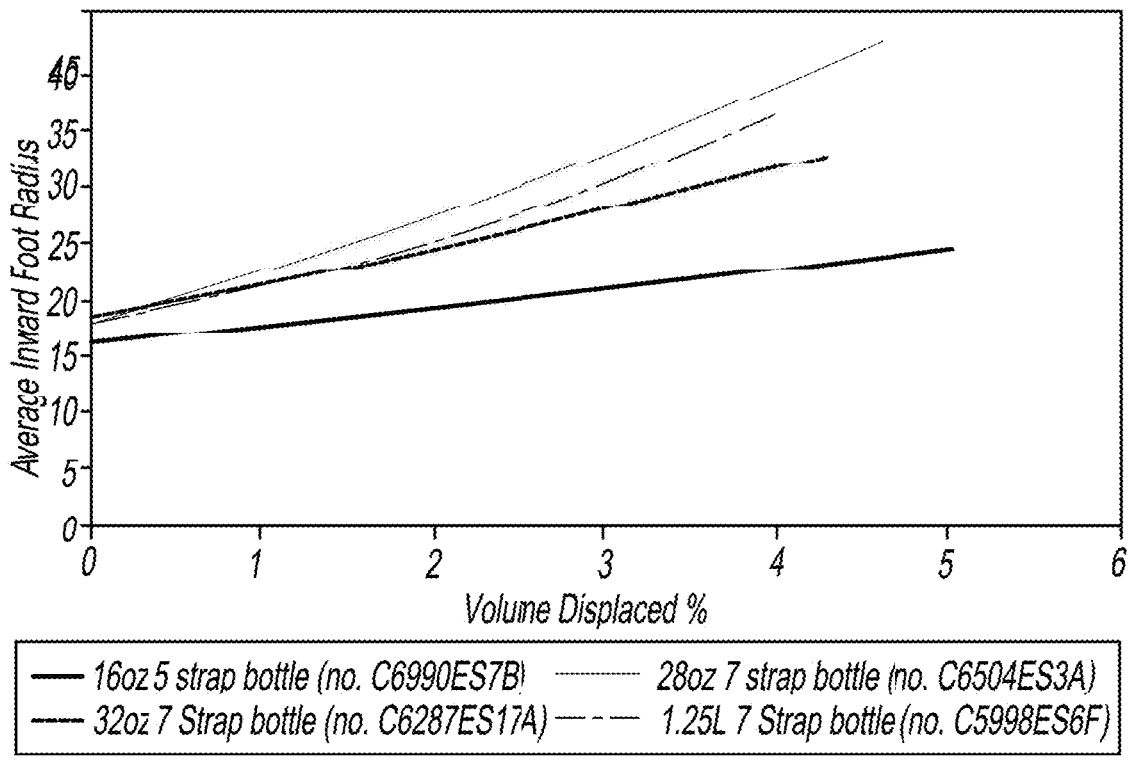
Figure 50:
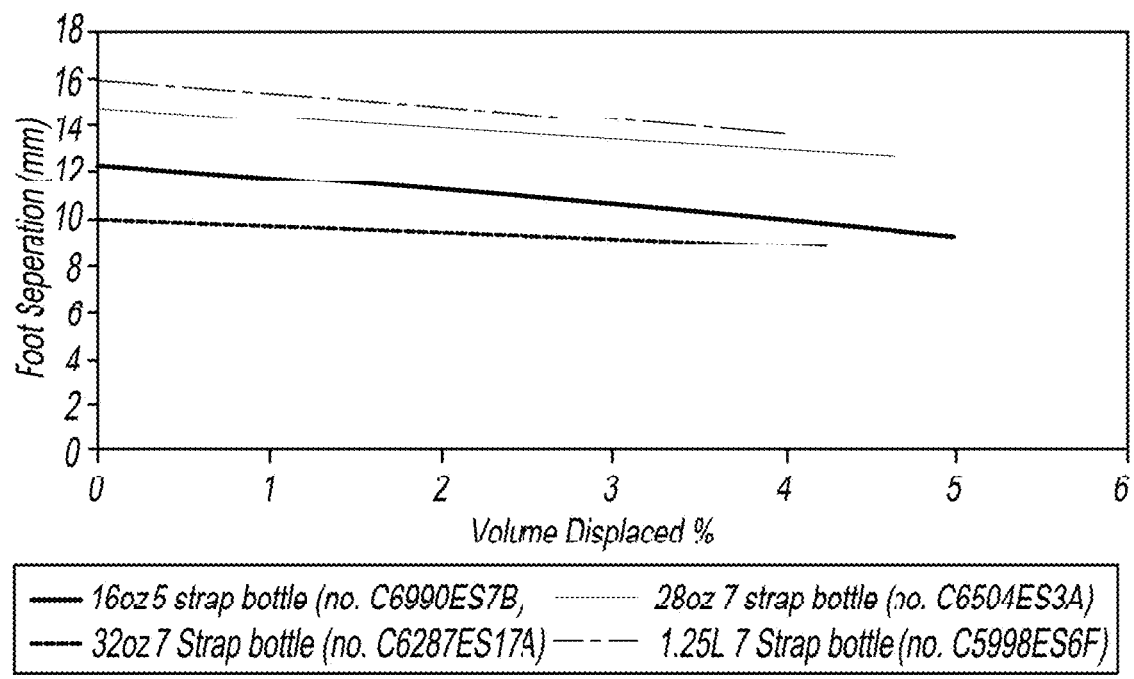
Figure 51:
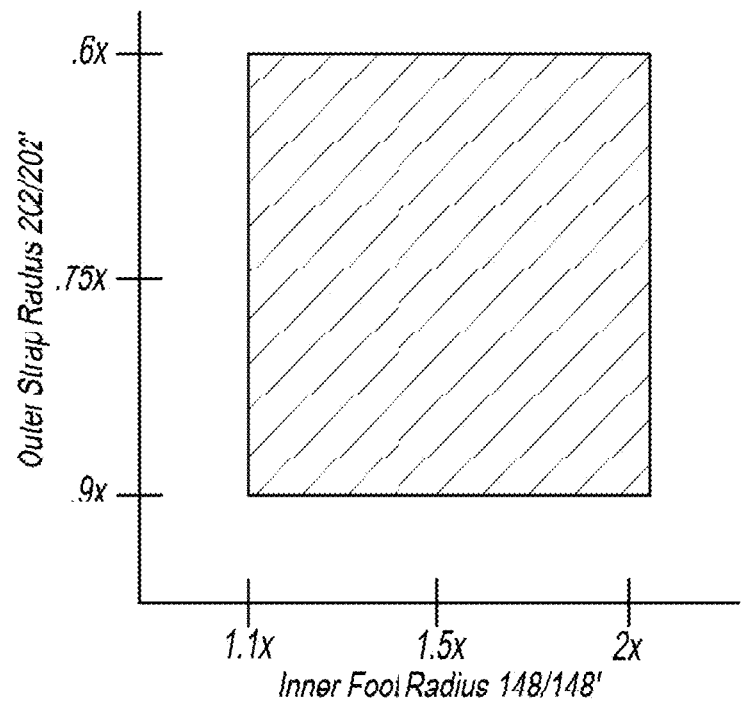
Figure 53:
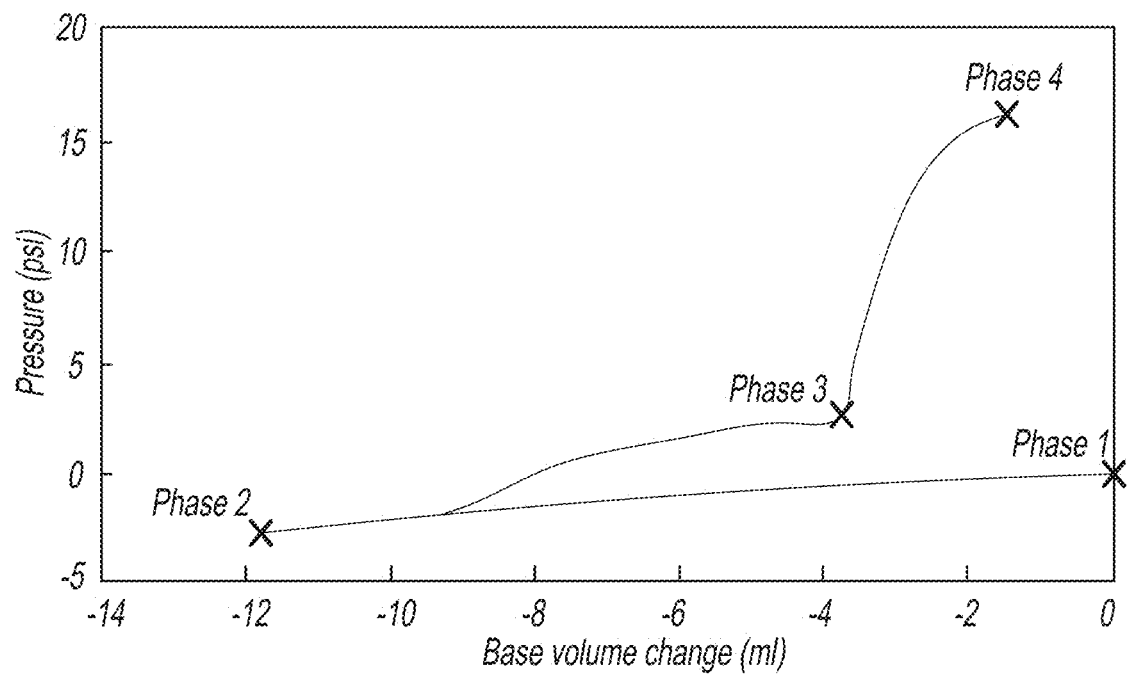
Figure 54:
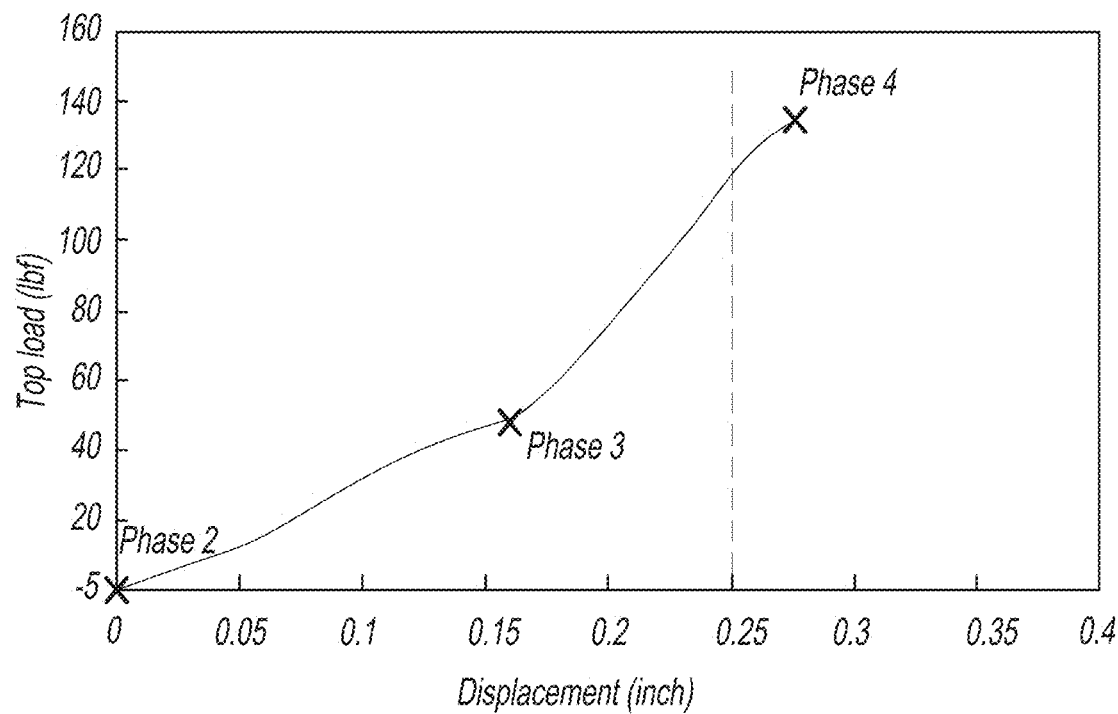
Figure 55:
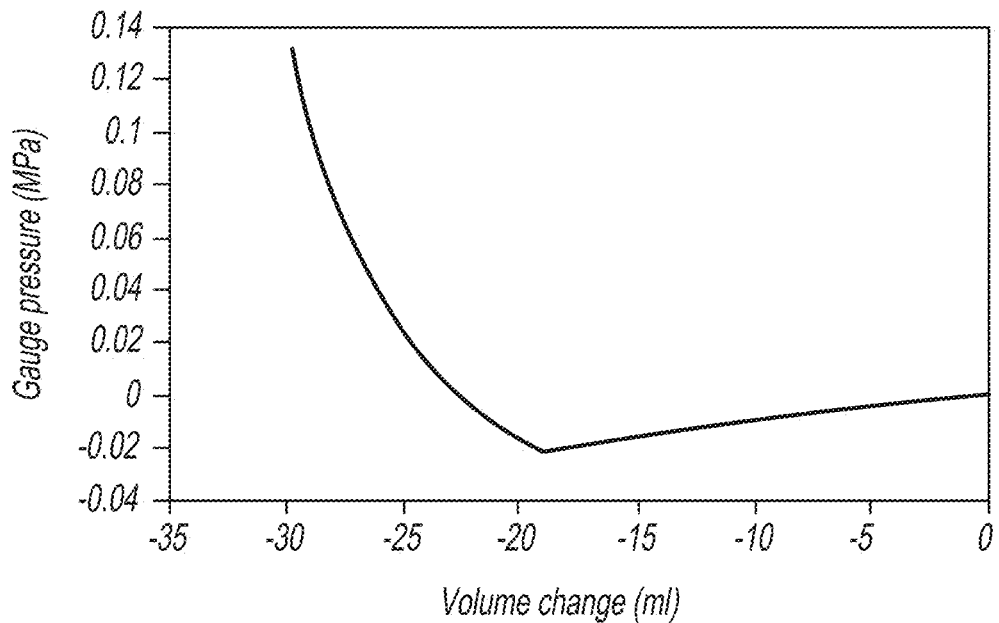
Figure 56:
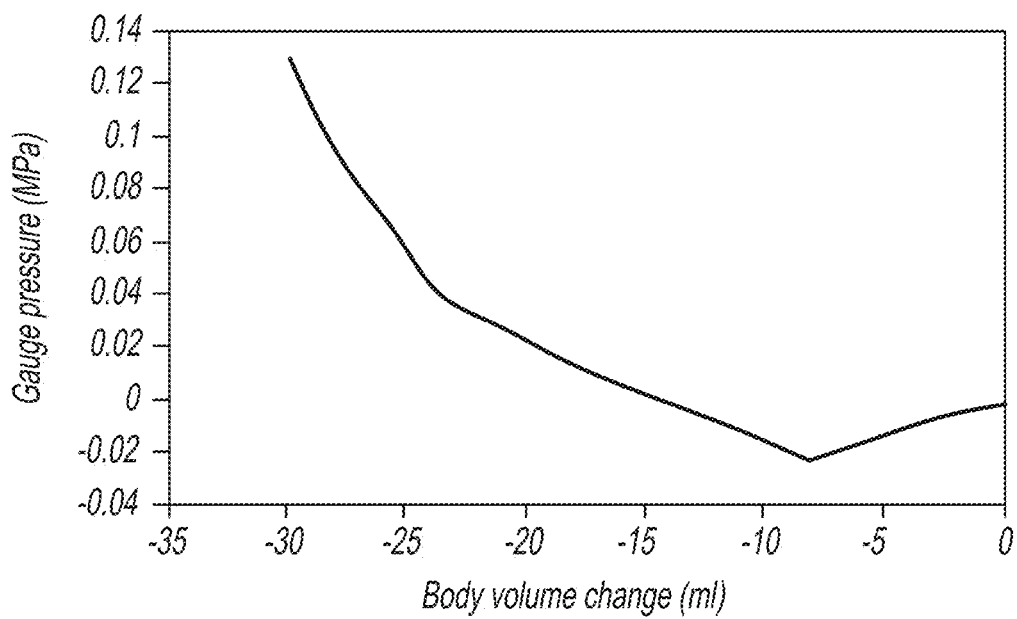
Figure 57:
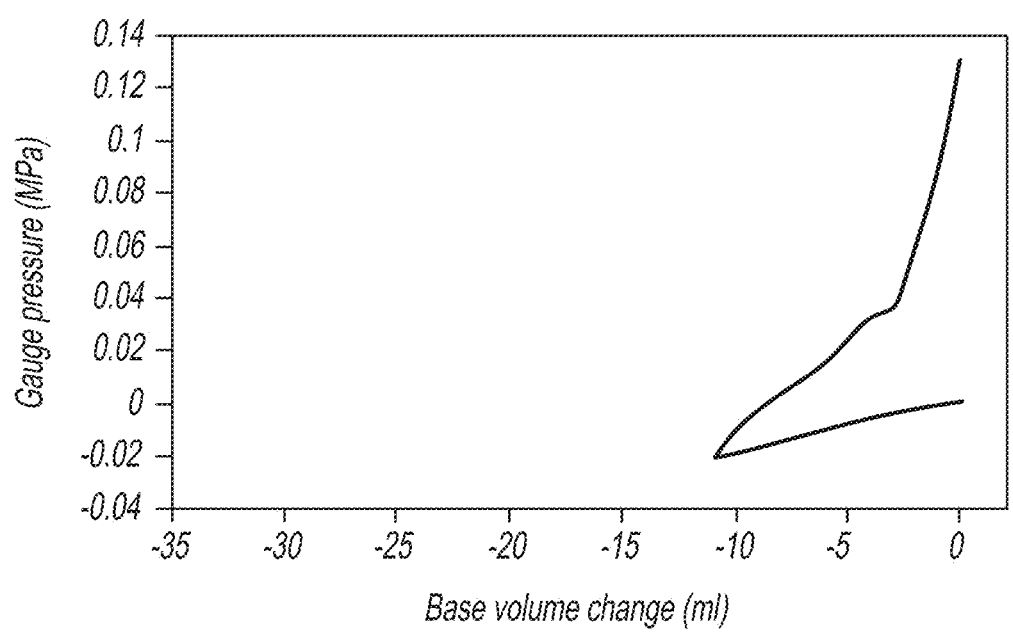
Figure 58B:
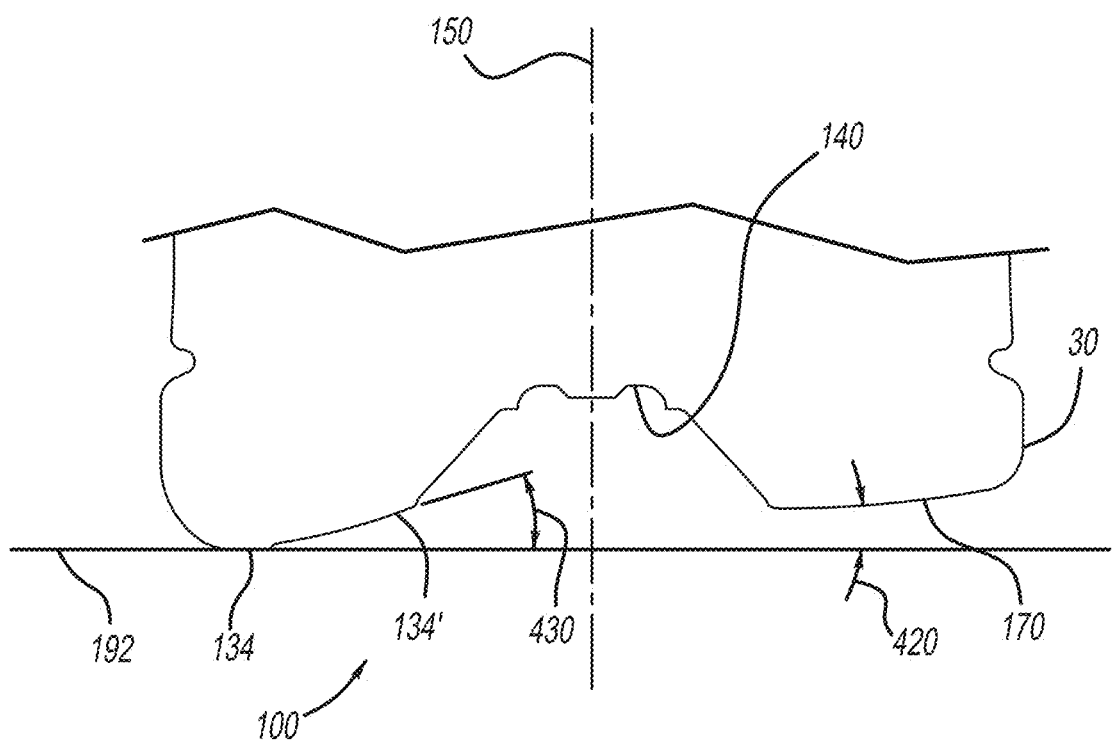
Figure 59A:
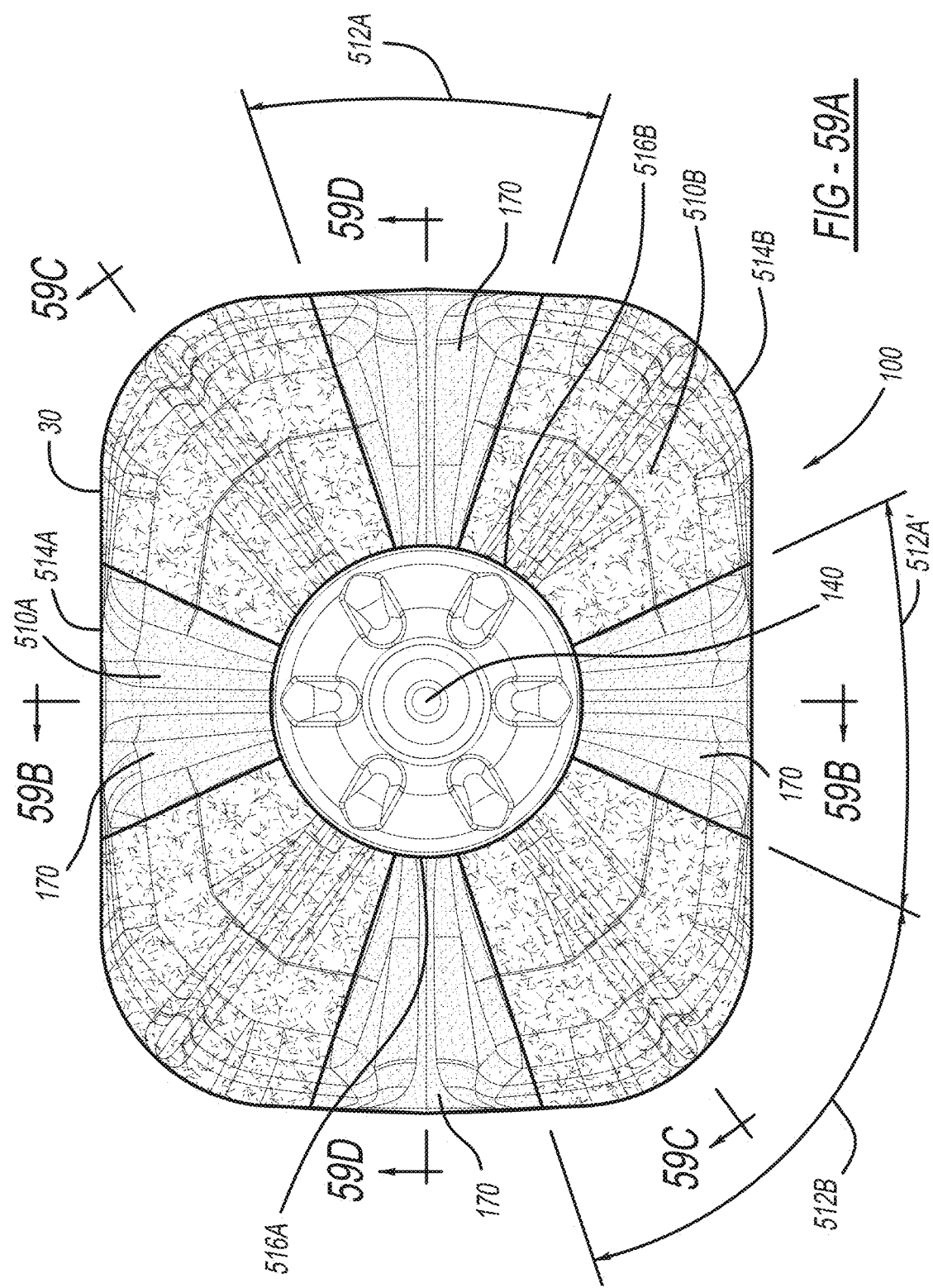
Figure 59B:
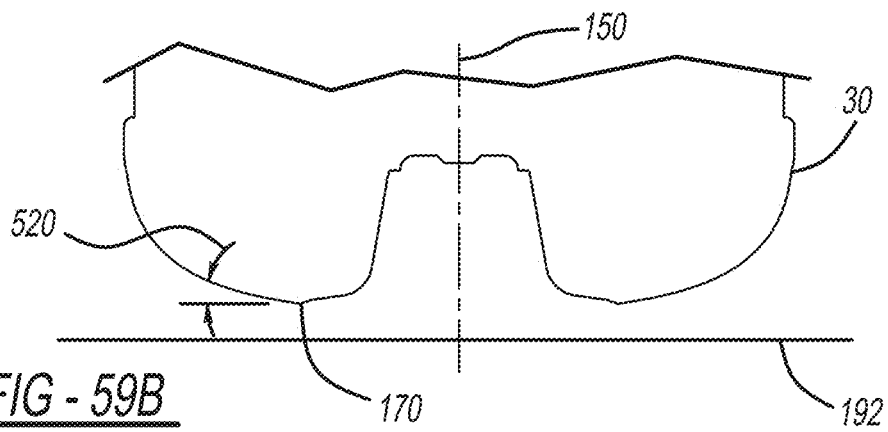
Figure 59C:
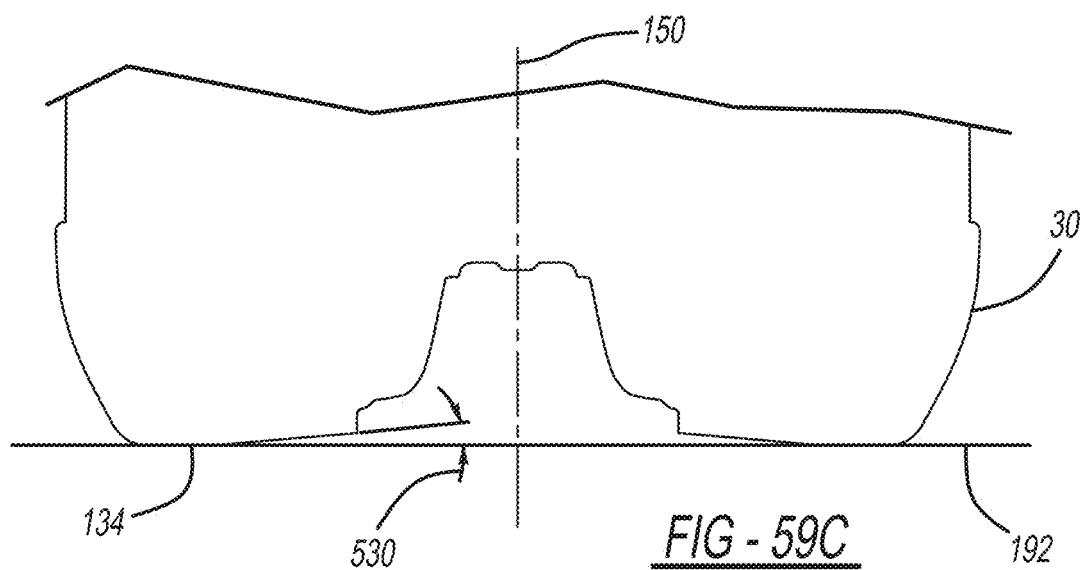
Figure 59D:
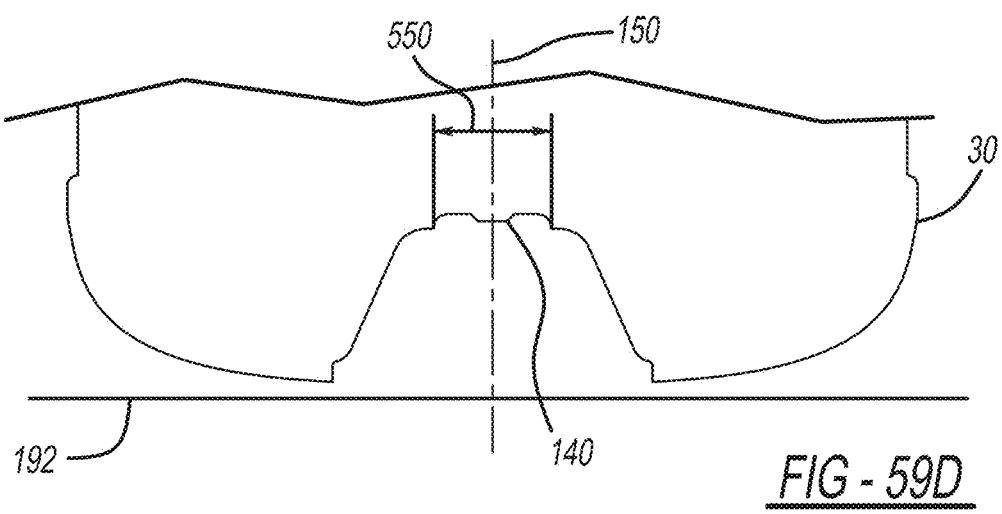

FIG. 46 is a graph illustrating relationship between outward strap radius and volume displacement of containers according to the present teachings;

FIG. 47 is a graph illustrating relationship between base clearance and volume displacement of containers according to the present teachings;

FIG. 48 is a graph illustrating relationship between standing base radius and volume displacement of containers according to the present teachings;

FIG. 49 is a graph illustrating relationship between inward foot radius and volume displacement of containers according to the present teachings;

FIG. 50 is a graph illustrating relationship between foot separation and volume displacement of containers according to the present teachings;

FIG. 51 is a graph illustrating relationship between an outer strap radius and an inner foot radius of containers according to the present teachings;

FIG. 52A is a side view of another container according to the present teachings, the container in an as-blown, pre-filled configuration;

FIG. 52B is a side view of the container of FIG. 52A after the container has been hot-filled and has cooled;

FIG. 52C is a side view of the filled container of FIG. 52B subject to a top load pressure;

FIG. 52D is a side view of the filled container of FIG. 52C subject to further top load pressure;

FIG. 53 is a graph illustrating base volume change versus pressure of an exemplary container according to the present teachings;

FIG. 54 is a graph of filled, capped, and cooled top load versus displacement of an exemplary container according to the present teachings;

FIG. 55 is a graph illustrating volume change versus gauge pressure of an exemplary container according to the present teachings;

FIG. 56 is a graph illustrating body volume change versus gauge pressure of an exemplary container according to the present teachings;

FIG. 57 is a graph illustrating base volume change versus gauge pressure of an exemplary container according to the present teachings;

FIG. 58A is a plan view of a container base in accordance with the present teachings;

FIG. 58B is a cross-sectional view taken along line 58B-58B of FIG. 58A;

FIG. 59A is a plan view of an additional container base according to the present teachings;

FIG. 59B is a cross-sectional view taken along line 59B-59B of FIG. 59A;

FIG. 59C is a cross-sectional view taken along line 59C-59C of FIG. 59A;

FIG. 59D is a cross-sectional view taken along line 59D-59D of FIG. 59A; and

FIG. 60A, FIG. 60B, FIG. 60C, FIG. 60D, and FIG. 60E illustrate properties of an additional container in accordance with the present teachings.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a container being made of PET and incorporating a base design having an optimized size and shape that resists container loading and pressures caused by hot fill pressure and resultant vacuum, and helps maintain container shape and response.

It should be appreciated that the size and specific configuration of the container may not be particularly limiting and, thus, the principles of the present teachings can be applicable to a wide variety of PET container shapes. Therefore, it should be recognized that variations can exist in the present embodiments. That is, it should be appreciated that the teachings of the present disclosure can be used in a wide variety of containers, including rectangular, round, oval, squeezable, recyclable, and the like.

As shown in FIGS. 1-5, the present teachings provide a plastic, e.g. polyethylene terephthalate (PET), container generally indicated at 10. The exemplary container 10 can be substantially elongated when viewed from a side and generally cylindrical when viewed from above and/or rectangular in throughout or in cross-sections (which will be discussed in greater detail herein). Those of ordinary skill in the art would appreciate that the following teachings of the present disclosure are applicable to other containers, such as rectangular, triangular, pentagonal, hexagonal, octagonal, polygonal, or square shaped containers, which may have different dimensions and volume capacities. It is also contemplated that other modifications can be made depending on the specific application and environmental requirements.

In some embodiments, container 10 has been designed to retain a commodity. The commodity may be in any form such as a solid or semi-solid product. In one example, a commodity may be introduced into the container during a thermal process, typically a hot-fill process. For hot-fill bottling applications, bottlers generally fill the container 10 with a product at an elevated temperature between approximately 155° F. to 205° F. (approximately 68° C. to 96° C.) and seal the container 10 with a closure before cooling. In addition, the plastic container 10 may be suitable for other high-temperature pasteurization or retort filling processes or other thermal processes as well. In another example, the commodity may be introduced into the container under ambient temperatures.

As shown in FIGS. 1-5, the exemplary plastic container 10 according to the present teachings defines a body 12, and includes an upper portion 14 having a cylindrical sidewall 18 forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. In some embodiments, sidewall portion 24 can extend down and nearly abut base 30, thereby minimizing the overall area of base portion 28 such that there is not a discernable base portion 28 when exemplary container 10 is uprightly-placed on a surface.

The exemplary container 10 may also have a neck 23. The neck 23 may have an extremely short height, that is, becoming a short extension from the finish 20, or an elongated height, extending between the finish 20 and the shoulder portion 22. The upper portion 14 can define an opening for filling and dispensing of a commodity stored therein. The container can be a beverage container; however, it should be appreciated that containers having different shapes, such as sidewalls and openings, can be made according to the principles of the present teachings.

The finish 20 of the exemplary plastic container 10 may include a threaded region 46 having threads 48, a lower sealing ridge 50, and a support ring 51. The threaded region provides a means for attachment of a similarly threaded closure or cap (not shown). Alternatives may include other suitable devices that engage the finish 20 of the exemplary plastic container 10, such as a press-fit or snap-fit cap for example. Accordingly, the closure or cap engages the finish 20 to preferably provide a hermetical seal of the exemplary plastic container 10. The closure or cap is preferably of a plastic or metal material conventional to the closure industry and suitable for subsequent thermal processing.

In some embodiments, the container 10 can comprise a lightweight base configuration 100 generally formed in base portion 28. Base configuration 100 can comprise any one of a number of features that facilitate vacuum response, improve structural integrity, minimize container weight, and/or improve overall performance of container 10. As discussed herein, base configuration 100 can be used in connection with any container shape, however, by way of illustration, containers having rectangular and cylindrical cross-sections will be examined. The base portion 28 functions to close off the bottom portion of the plastic container 10 to retain a commodity in the container 10. FIGS. 1-31B illustrate a variety of base configurations 100 and base portions 28 as well, as will be discussed.

Referring back to FIGS. 1-5, the base portion 28 of the plastic container 10, which extends inward from the body 12, can comprise one or more contact surfaces 134 and a central portion 136. In some embodiments, the contact surface(s) 134 is the area of the base portion 28 that contacts a support surface (e.g. shelf, counter, and the like) that in turn supports the container 10. As such, the contact surface 134 may be a flat surface (an individual flat surface or a collection of separately spaced flat surfaces that each lie within a common plane. The contact surface 134 can also be a line of contact generally circumscribing, continuously or intermittently, the base portion 28.

In the embodiments of FIGS. 1-5, the base portion 28 includes four contact surfaces 134, which are spaced away from each other about the longitudinal axis 150 of the container 10. Also, in the embodiments shown, the contact surfaces 134 are arranged at the corners of the base portion 28. However, it will be appreciated that there can be any number of contact surfaces 134 and the contact surfaces 134 can be disposed in any suitable position.

The base portion 28 can further include a central pushup portion 140, which is most clearly illustrated in FIGS. 4 and 5. The central pushup portion 140 can be centrally located (i.e., substantially centered on the longitudinal axis 150). The central pushup portion 140 can extend generally toward the finish 20. In some embodiments, the central pushup portion 140, when viewed in cross section (FIG. 5), is generally in the shape of a truncated cone having a top surface 146 that is generally parallel to the support surfaces 134. The pushup portion 140 can also include side surfaces 148 that slope upward toward the central longitudinal axis 150 of the container 10. The side surfaces 148 can be frusto-conic or can include a plurality of planar surfaces that are arranged in series about the axis 150.

Figure 17:
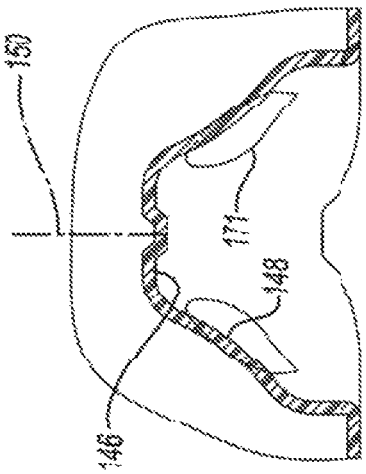
Figure 15:
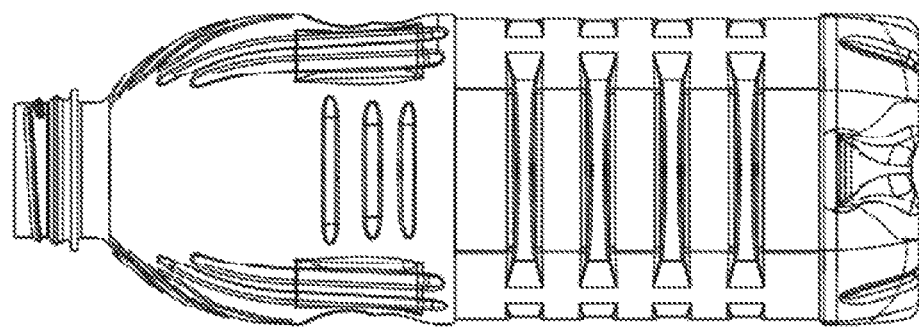
Figure 14:
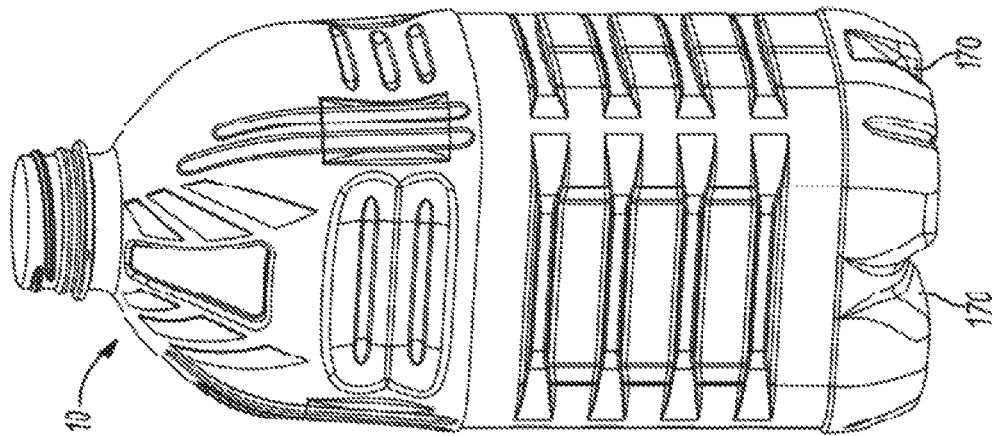
Figure 26A:
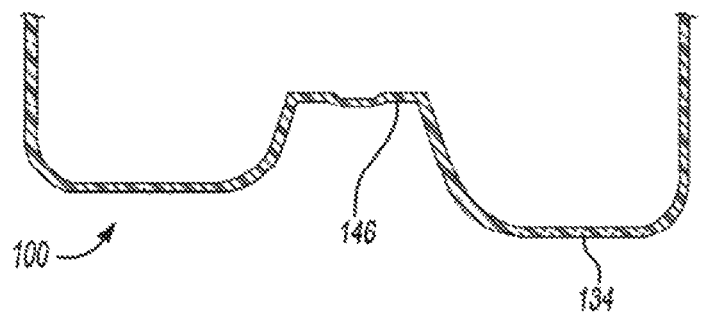
FIGS. 26A and 26B are section and side views, respectively, of a base portion of a container according to additional exemplary embodiments of the present disclosure.
Figure 26B:
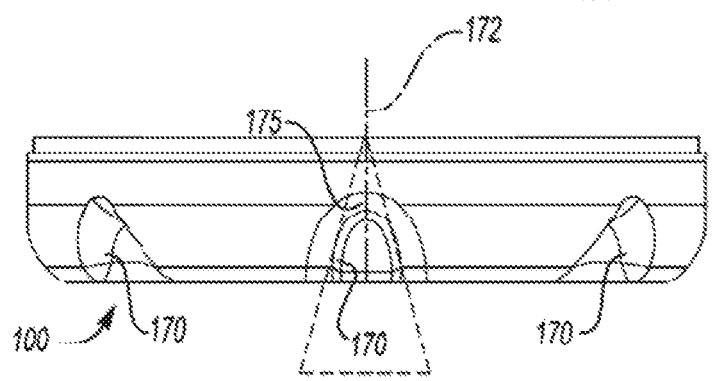
Figure 27A:
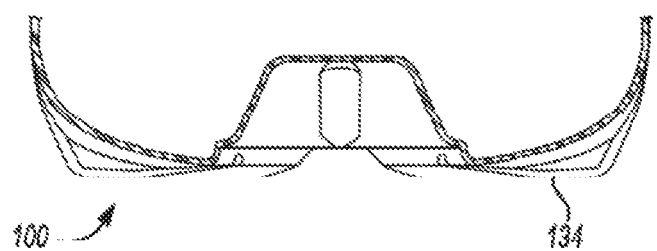
FIGS. 27A and 27B are section and side views, respectively, of a base portion of a container according to additional exemplary embodiments of the present disclosure.
Figure 27B:
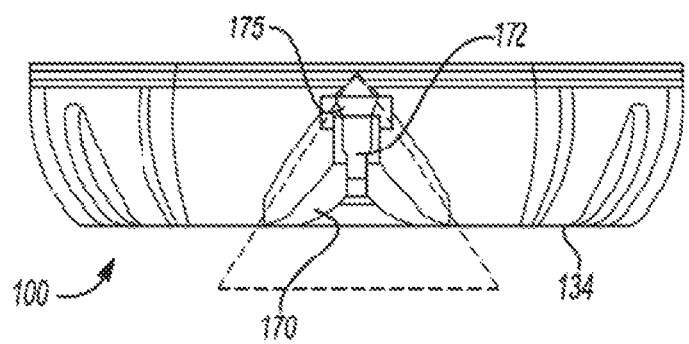
Figure 28A:
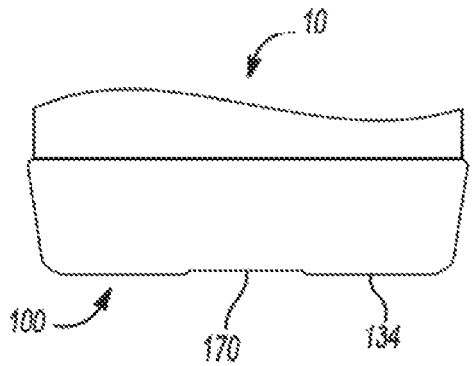
FIGS. 28A and 28B are front and side views, respectively, of a generally rectangular container according to additional exemplary embodiments of the present disclosure.
Figure 28B:
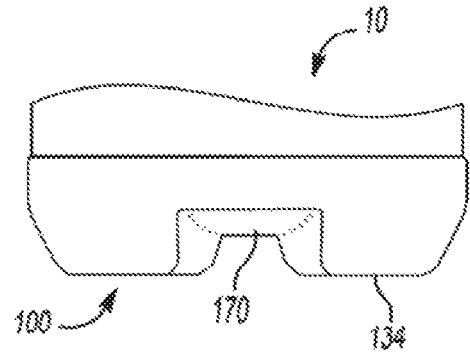
Figure 29A:
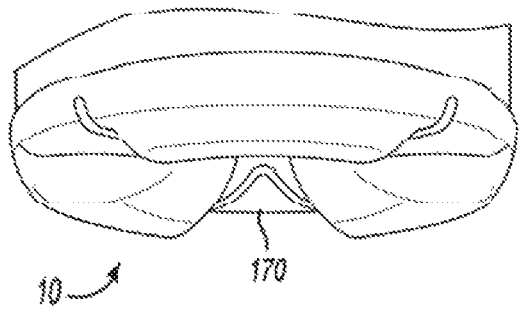
FIGS. 29A and 29B are perspective and bottom views, respectively, of a generally cylindrical container according to additional exemplary embodiments of the present disclosure.
Figure 29B:
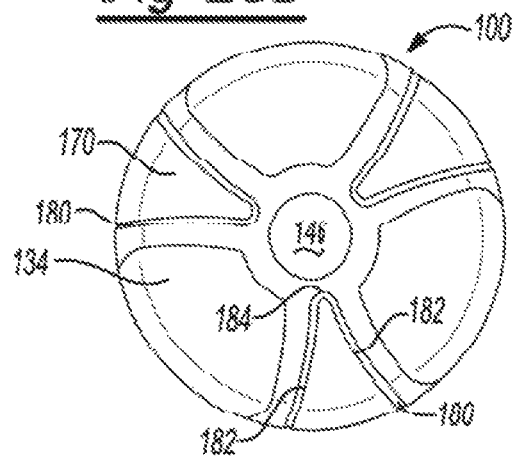
Figure 30A:
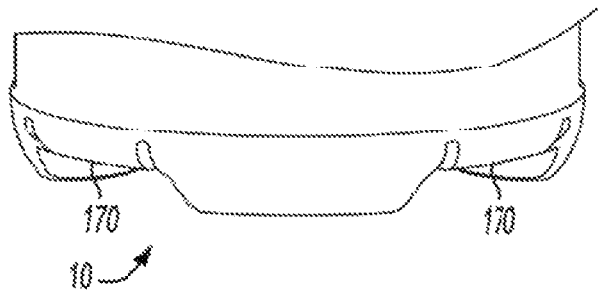
FIGS. 30A and 30B are perspective and bottom views, respectively, of a generally cylindrical container according to additional exemplary embodiments of the present disclosure.
Figure 30B:
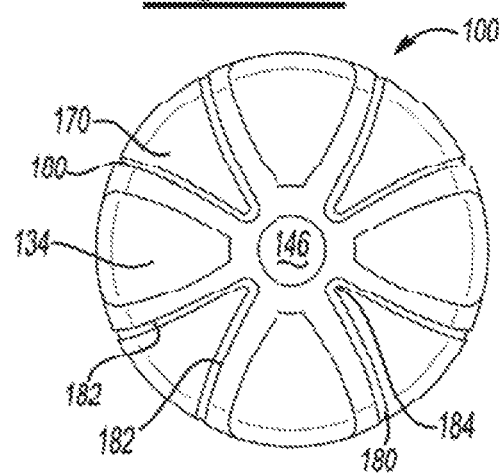
Figure 35A:
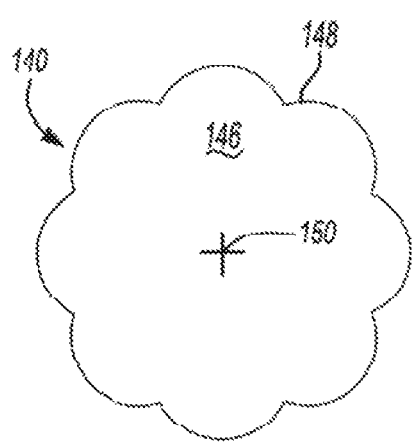
FIGS. 35A-35D are schematic bottom views of a central pushup portion of a container according to teachings of the present disclosure.
Figure 35B:
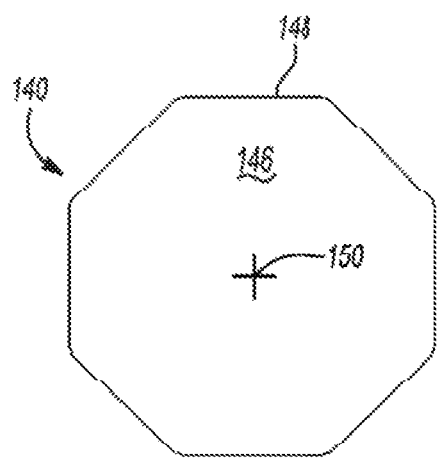
Figure 35C:
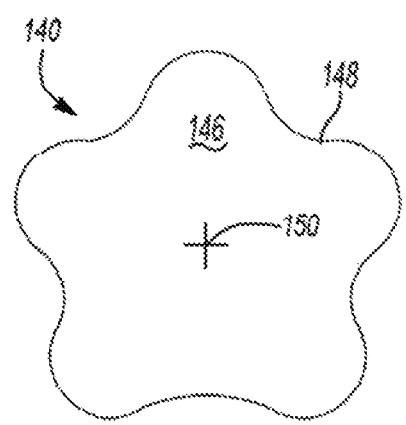
Figure 35D:
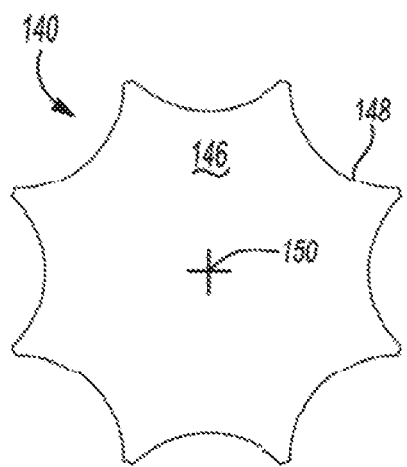

Other shapes of the central pushup portion 140 are within the scope of the present disclosure. For instance, as shown in FIG. 13, the pushup portion 140 can be partially frusto-conic and partially cylindrical. Also, as shown in FIGS. 17, 23, and 25, the pushup portion 140 can be generally frusto-conic with a plurality of ribs 171 that extend at an angle along the side surface 148 at equal spacing about the axis 150. Moreover, as shown in FIGS. 19 and 21, the pushup portion 140 can be annular, so that a depending frusto-conic projects exteriorly along the axis 150. FIGS. 35A-35D show additional shapes for the pushup portion 140 (in respective bottom views of the container 10). For instance, the top surface 146 can be defined by a plurality of convexly curved lines that are arranged in series about the axis (FIG. 35A), an octagon or other polygon (FIG. 35B), alternating convexly and concavely curved lines (FIG. 35C), and a plurality of concavely curved lines (FIG. 35D). The side surface(s) 148 can project therefrom to have a corresponding shape.

Figure 34:
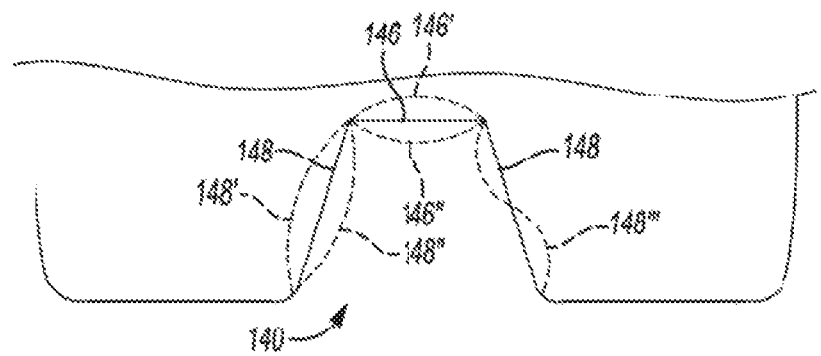
FIG. 34 is a schematic section view of a container showing various curving surfaces of a central pushup portion thereof.

As shown in FIG. 34, the top surface 146 and/or the side surface(s) 148 can have a concave and/or convex contour. For instance, the top surface 146 can have a concave curvature (indicated at 146') or a convex curvature (indicated at 146"). Additionally, the side surface 148 can have a concave curvature (indicated at 148'), a convex curvature (indicated at 148"), or a S-shaped combination concave and convex curvature (indicated at 148'"). This curvature can be present when the container 10 is empty. Also, the curvature can be the result of deformation due to vacuum loads inside the container 10.

The side surface 148 can also be stepped in some embodiments. Also, the side surface 148 can include ribs, convex or concave dimples, or rings.

The exact shape of the central pushup 140 can vary greatly depending on various design criteria. For additional details about suitable shapes of central pushup 140, attention should be directed to commonly-assigned U.S. patent application Ser. No. 12/847,050, which published as U.S. Patent Publication No. 2011/0017700, which was filed on Jul. 30, 2010, and which is incorporated herein by reference in its entirety.

The central pushup 140 is generally where the preform gate is captured in the mold when the container 10 is blow molded. Located within the top surface 146 is the subportion of the base portion 28, which typically includes polymer material that is not substantially molecularly oriented.

The container 10 can be hot-filled and, upon cooling, a vacuum in the container 10 can cause the central pushup 140 to move (e.g., along the axis 150, etc.) to thereby decrease the internal volume of the container 10. The central pushup 140 can also resiliently bend, flex, deform, or otherwise move in response to these vacuum forces. For instance, the top surface 146 can be flat or can convexly curve without the vacuum forces, but the vacuum forces can draw the top surface 146 upward to have a concave curvature as shown in FIG. 34. Likewise, the side surfaces 148 can deform due to the vacuum to be concave and/or convex as shown in FIG. 34. Thus, the central pushup 140 can be an important component of vacuum performance of the container 10 (i.e., the ability of the container 10 to absorb these vacuum forces without losing its ability to contain the commodity, withstand top loading, etc.)

Various factors have been found for the base portion 28 that can enhance such vacuum performance. In conventional applications, it has been found that material can be trapped or otherwise urged into the pushup portion of the base. The amount of material in these conventional applications is often more than is required for loading and/or vacuum response and, thus, represents unused material that adds to container weight and cost. This can be overcome by tailoring the pushup diameter (or width in terms of non-conical applications) and/or height to achieve improved loading and/or vacuum response from thinner materials. That is, by maximizing the performance of the central pushup 140, the remaining container portions need not be designed to withstand a greater portion of the loading and vacuum forces, thereby enabling the overall container to be made lighter at a reduced cost. When all portions of the container are made to perform more efficiently, the container can be more finely designed and manufactured.

To this end, it has been found that by reducing the diameter of central pushup 140 and increasing the pushup height thereof, the material can be stretched more for improved performance. With reference to FIG. 5, each container 10 having pushup 140 defines several dimensions, including a pushup width Wp (which is generally a diameter of the entrance of central pushup 140), a pushup height Hp (which is generally a height from the contact surface 134 to the top surface 146), and an overall base width Wb (which is generally a diameter or width of base portion 28 of container 10). Based on performance testing, it has been found that relationships exist between these dimensions that lead to enhanced performance. Specifically, it has been found that a ratio of pushup height Hp to pushup width Wp of about 1:1.3 to about 1:1.4 is desirable (although ratios of about 1:1.0 to about 1:1.6 and ratios of about 1:1.0 to about 1:1.7 can be used). Moreover, a ratio of pushup width Wp to overall base width Wb of about 1:2.9 to about 1:3.1 is desirable (although ratios of about 1:2.9 to about 1:3.1 and ratios of about 1:1.0 to about 1:4.0 can be used). Moreover, in some embodiments, central pushup 140 can define a major diameter (e.g. typically equal approximately to the pushup width Wp or the diameter at the lowermost portion of central pushup 140). The central pushup 40 can further define a minor diameter (e.g. typically equal to the diameter of the top surface 146 or the width at the uppermost portion of central pushup 140). The combination of this major diameter and minor diameter can result in the formation of a truncated conical shape. Moreover, in some embodiments, the surface of this truncated conical shape can define a draft angle of less than about 45 degrees relative to central longitudinal axis 150. It has been found that this major diameter or width can be less than about 50 mm and the minor diameter or width can be greater than about 5 mm, separately or in combination.

Figure 8:
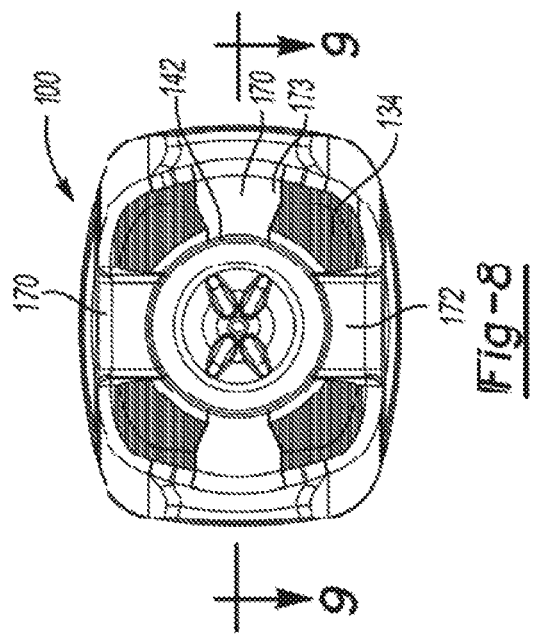
Figure 9:
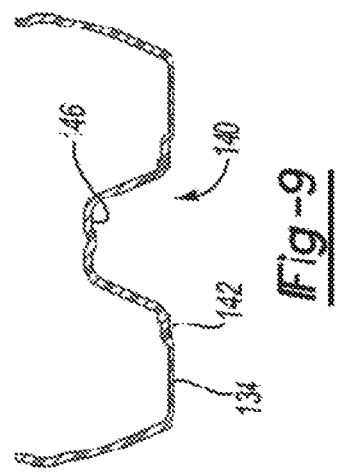
Figure 7:
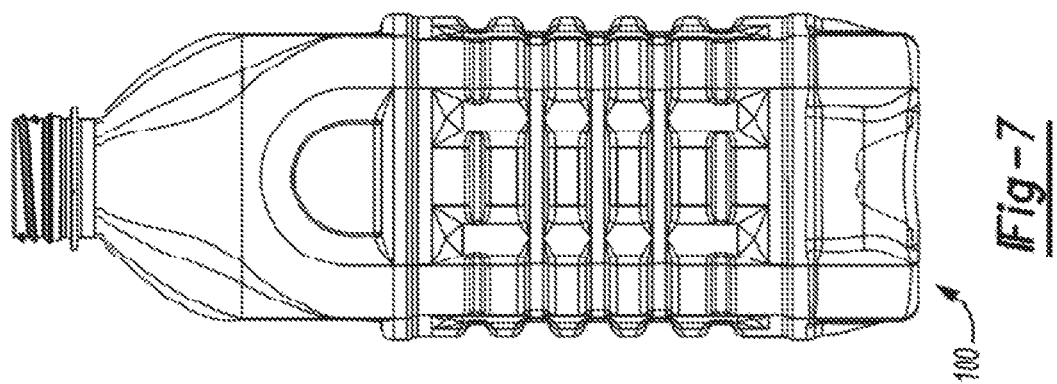
Figure 6:
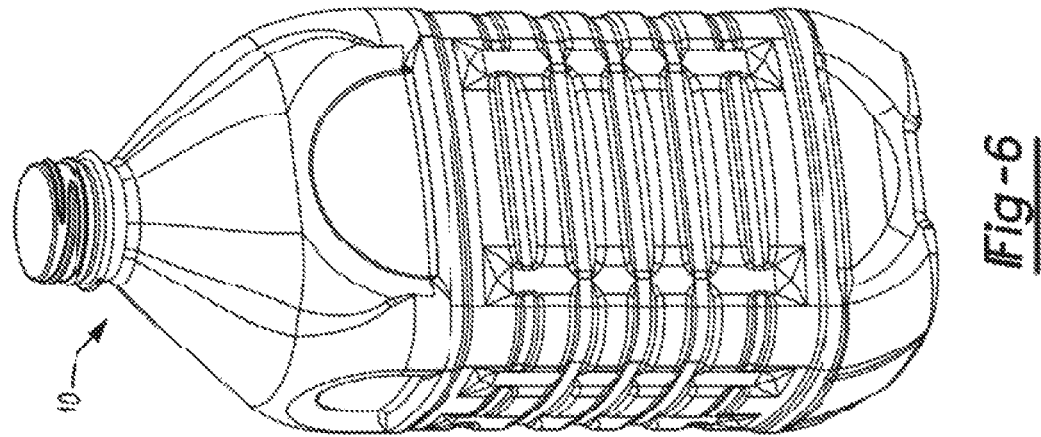
Figure 16:
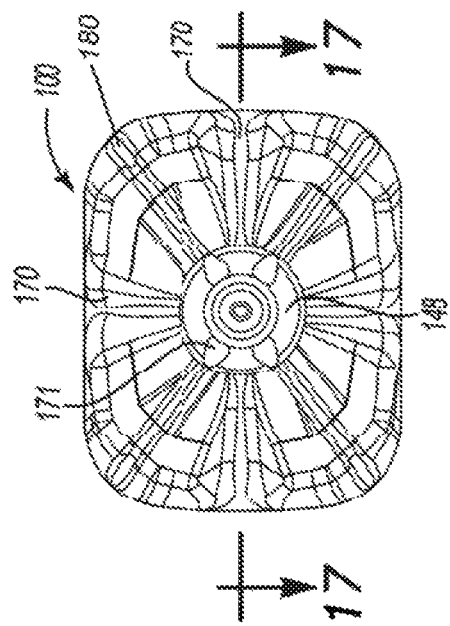

In some embodiments shown in FIGS. 8 and 9, the container 10 can include an inversion ring 142. The inversion ring 142 can have a radius that is larger than the central pushup 140, and the inversion ring 142 can completely surround and circumscribe the central pushup 140. In the position shown in FIGS. 8 and 9 and under certain internal vacuum forces, the inversion ring 142 can be drawn upward along the axis 150 away from the plane defined by the contact surface 134. However, when the container 10 is formed, the inversion ring 142 can protrude outwardly away from the plane defined by the contact surface 134. The transition between the central pushup 140 and the adjacent inversion ring 142 can be rapid in order to promote as much orientation as near the central pushup 140 as possible. This serves primarily to ensure a minimal wall thickness for the inversion ring 142, in particular at the contact surface 134 of the base portion 28. At a point along its circumferential shape, the inversion ring 142 may alternatively feature a small indentation, not illustrated but well known in the art, suitable for receiving a pawl that facilitates container rotation about the central longitudinal axis 150 during a labeling operation.

In some embodiments, as illustrated throughout the figures and notably in FIGS. 28A-31A, the container 10 can further comprise one or more straps 170 formed along and/or within base portion 28. As can be seen throughout FIGS. 1-25, straps 170 can be formed as recessed portions that are visible from the side of container 10. That is, straps 170 can be formed such that they define a surface (i.e., a strap surface 173 that defines a strap axis of the respective strap 170). The strap surface 173 can be offset at a strap distance Ds (FIG. 2) from contact surface(s) 134 in the Z-axis (generally along central longitudinal axis 150 of container 10). In some embodiments, this offset Ds between straps 170 and contact surface 134 can be in the range of about 5 mm to about 25 mm. Also, the strap surface 173 can extend transverse to the axis 150 to terminate adjacent the sidewall portion 24. The periphery of the straps 170 can contour so as to transition into the sidewall portion 24 and/or the contact surfaces 134.

At least a portion of the strap surface 173 can extend substantially parallel to the plane of the contact surfaces 134 as shown in FIGS. 1-4. Also, in some embodiments illustrated in FIGS. 10-12, at least a portion of the strap surface 173 can be partially inclined at a positive angle relative to the contact surface 134. The angle can be less than 15 degrees in some embodiments. The angle can be greater than 15 degrees in other embodiments.

Figure 36:
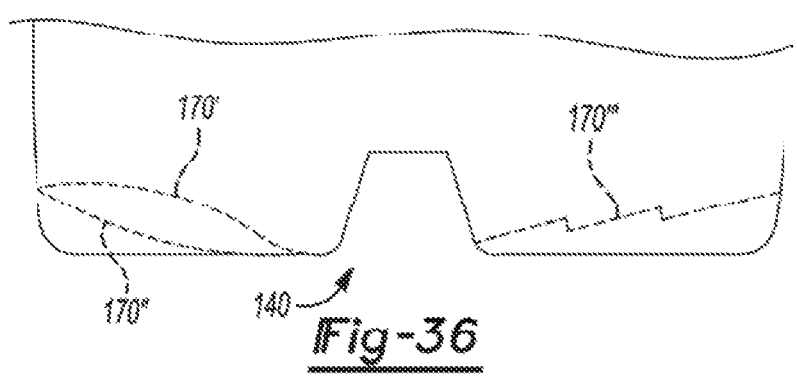
FIG. 36 is a schematic section view of a container showing various shapes for straps thereof.

FIG. 36 shows various shapes that the straps 170 can have. For instance, the straps can concavely contour toward the interior of the container 10 as the strap extends in the transverse direction (indicated at 170'). The strap can also convexly contour away from the interior as the strap extends in the transverse direction (indicated at 170"). Moreover, the strap can have one or more steps the along the axis 150 as the strap extends in the transverse direction (indicated at 170''').

Figure 37:
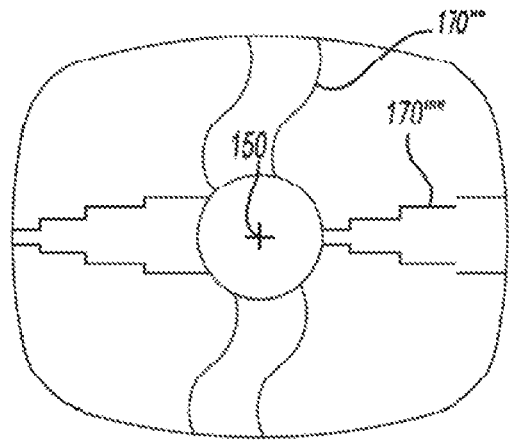
FIGS. 37-39 are schematic bottom views of the container showing various shapes for straps thereof.
Figure 38:
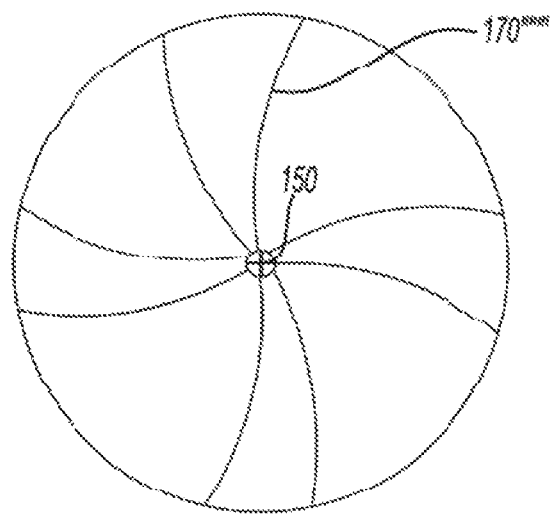
Figure 39:
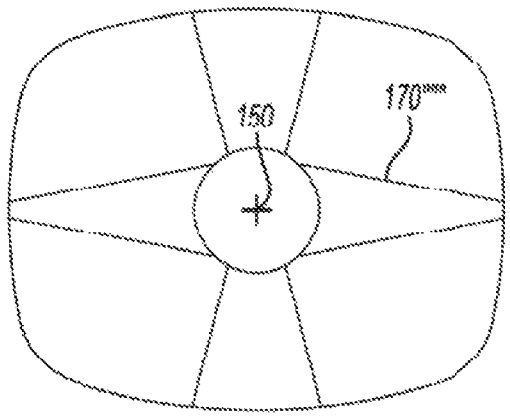

FIGS. 37-39 show how the straps can be shaped in plan view (viewed along the longitudinal axis 150). For instance, the strap can have a sinusoidal curvature in the transverse direction (indicated at 170"" in FIG. 37). The strap can also include steps as the strap extends in the transverse direction (indicated at 170"''' in FIG. 37). The width of the strap can increase (shown on the right side of FIG. 37) or can decrease (shown on the left side of FIG. 37) as the strap extends transversely away from the longitudinal axis 150. Moreover, the strap can smoothly taper in the transverse direction (indicated at 170 in FIG. 39). The width of the strap can either increase (top and bottom straps of FIG. 39) or decrease (left and right straps of FIG. 39) as the strap extends away from the longitudinal axis 150. Additionally, the straps can radiate from the longitudinal axis 150 and can each have a substantially common curvature in the transverse direction to resemble a pinwheel (indicated at 170"'''' in FIG. 38). Other shapes, curvatures, etc. are also within the scope of the present disclosure.

The shape, dimensions, and other features of the straps 170 can depend upon container shape, styling, and performance criteria. Moreover, it should be recognized that the offset (along the axis 15) of one strap 170 can differ from the offset of another strap 170 on a single container to provide a tuned or otherwise varied load response profile. Straps 170 can interrupt contact surface 134, thereby resulting in a plurality of contact surfaces 134 (also known as a footed or segmented standing surface). Because of the offset nature of straps 170 and their associate shape, size, and inclination (as will be discussed), straps 170 is visible from a side view orientation and formable via simplified mold systems (as will be discussed).

It has been found that the use of straps 170 can serve to reduce the overall material weight needed within base portion 28, compared to conventional container designs, while simultaneously providing sufficient and comparable vacuum performance. In other words, straps 170 have permitted containers according to the principles of the present teachings to achieve and/or exceed performance criteria of conventional containers while also minimizing container weight and associated costs.

In some embodiments, container 10 can include at least one strap 170 disposed in base portion 28. However, in alternative designs, additional straps 170 can be used, such as two, three, four, five, or more. Multiple straps 170 can radiate from the central pushup portion 140 and the longitudinal axis 150. In some embodiments, the straps 170 can be equally spaced apart about the axis 150.

Typically, although not limiting, rectangular containers (FIGS. 1-28B) may employ two or more even-numbered straps 170. The straps 170 can, in some embodiments, bisect the midpoint (i.e., the middle region) of the respective sidewall. Stated differently, the strap 170 can intersect the respective sidewall approximately midway between the adjacent sidewalls. If the sidewall portion 24 defines a different polygonal cross section (taken perpendicular to the axis 150), the straps 170 can similarly bisect the sidewalls.

Similarly, although not limiting, cylindrical containers (FIGS. 29A-30B) may employ three or more odd-numbered or even-numbered straps 170. As such, straps 170 can be disposed in a radial orientation such that each of the plurality of straps 170 radiates from a central point of base portion 28 to an external edge of the container 10 (e.g. adjacent sidewall portion 24). It should be noted, however, that although straps 170 may radiate from a central point, that does not mean that each strap 170 actually starts at the central point, but rather means that if a central axis of each strap 170 was extended inwardly they would generally meet at a common center. The relationship of the number of straps used to radial strength of container 10 has shown an increasing radial strength with an increasing number of straps used (see FIG. 23B).

It should also be noted that strap 170 can be used in conjunction with the aforementioned central pushup 140, which would thereby interrupt straps 170. However, alternatively, it should be noted that benefits of the present teachings may be realized using straps 170 without central pushup 140.

As illustrated in the several figures, straps 170 can define any one or a number of shapes and sizes having assorted dimensional characteristics and ranges. However, it has been found that particular strap designs can lead to improved vacuum absorption and container integrity. By way of non-limiting example, it has been found that straps 170 can define a strap plane or central axis 172 that is generally parallel to contact surface 134 and/or a surface upon which container 10 sits, thereby resulting in a low strap angle. In other embodiments, strap plane/axis 172 can be inclined relative to contact surface 135 and/or the surface upon which container 10 sits, thereby resulting in a high strap angle. In some embodiments, this inclined strap plane/axis 172 can be inclined such that a lowest-most portion of inclined strap plane/axis 172 is toward an inbound or central area of container 10 and a highest-most portion of inclined strap plane/axis 172 is toward an outbound or external area of container 10 (e.g. adjacent sidewall portion 24). Examples of such inclination can be seen in FIGS. 26B and 27B.

Low strap angles (e.g., FIGS. 1-4) provide base flexibility resulting in base flex that displaces volume through upward deflection. This upward deflection will be enhanced under vertical load providing additional volume displacement, transitioning to positive pressure to maximize filled capped topload. The volume displacement causes increased vacuum in the container 10. This complementary "co-flex base" technology provides volume displacement & filled capped topload performance thereby resulting in a "lightweight panel-less" container configuration for multi-serve applications. Conversely, a high strap angle (e.g., FIGS. 26B and 27B) provides base rigidity resulting in a base that enhances vertical and horizontal load bearing properties. Rectangular container designs provide sufficient volume displacement. This complementary "rigid-base" technology provides enhanced handling properties on fill-lines and tray distribution offerings thereby resulting in a "lightweight tray capable" container configuration for multi-serve applications.

Figure 33A:
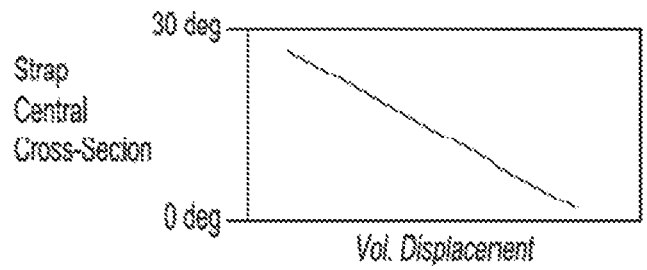
FIGS. 33A-33C is a series of graphs illustrating the relationship between strap inclination angle and volume displacement, the number of straps and radial strength, the strap peak angle and volume displacement, and between dimensions of a strap of the container and a volume displacement of a hot-filled container.
Figure 33B:
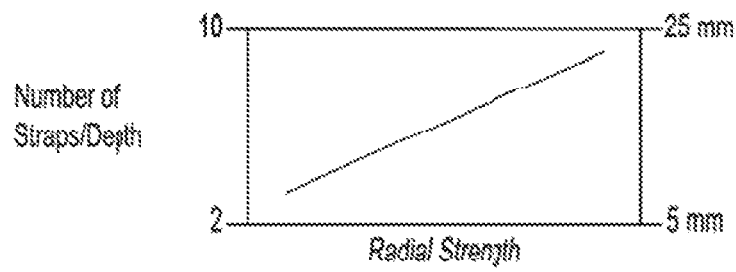
Figure 33C:
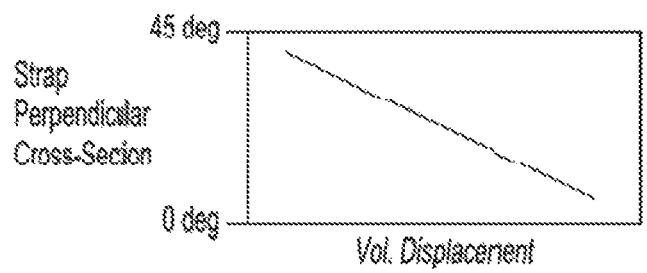

By way of non-limiting example, it has been found that an inclination angle α (FIG. 19) of strap plane/axis 172 of about 0 degrees to about 30 degrees (i.e. strap angle) can provide improved performance. This strap angle α can be measured in a side cross-section take along strap plane or axis 172 relative to a horizontal reference plane or axis as shown in FIG. 19. However, it should be recognized that other strap angles may be used and/or the direction of inclination can be varied. The relationship of inclination angle α to volume displacement of container 10 has shown an increasing volume displacement with a decreasing inclination angle α (see FIG. 33A).

With particular reference to FIGS. 26A-27B, it should be noted that strap 170 can further define or include a secondary contour or shape when viewed generally along strap plane or axis 172. That is, when viewing from the side of the container 10, the strap 170 can define a peaked shape or trapezoid shape adjacent the sidewall portion 24 having a raised central area and downwardly extending side surfaces (see FIGS. FIGS. 26B and 27B) as opposed to defining a generally flat, single plane. The trapezoidally shaped portion can be planar also and disposed at a draft angle relative to a horizontal (imaginary) reference line. This draft angle can be between 0 degrees and 45 degrees. In some embodiments, this section of the strap 170 can have a triangular shape that further provides improved vacuum response and structural integrity while simultaneously permitting reduction in material weight and costs. By way of non-limiting example, it has been found that a peak 175 of the strap 170 (FIGS. 19, 26B and 27B) can define a peak angle β (FIG. 19) relative to a vertical or perpendicular reference line in the range of about 0 degrees to 90 degrees (flat strap 170). In some embodiments, peak angle β can define a range of about 1 degree to about 45 degrees. However, it should be recognized that other angles may be used and/or the direction and overall shape of strap 170 can be varied. The relationship of peak angle β to volume displacement of container 10 has shown an increasing volume displacement with a decreasing peak angle β (see FIG. 23C).

In some embodiments, as illustrated in FIGS. 1, 12, 16, 18, 20, 22, 24, 29B, 30B, and 40-42, base portion 28 can further comprise one or more ribs 180 formed in (e.g., entirely within) or along strap 170, or between two straps 170. Ribs 180 can include an inwardly-directed channel (recessed toward the interior of the container 10) or outwardly-directed channel (projecting outward from the interior of the container 10). Also, the rib 180 can be contained entirely within the respective strap 170 or can extend out of the respective strap 170 in some embodiments. The ribs 180 can serve to tune or otherwise modify the vacuum response characteristics of straps 170. In this way, ribs 180 serve to modify the response profile of one or more straps 170. With reference to the several figures, ribs 180 can follow one of a number of pathways, such as a generally V-shaped pathway (FIGS. 29B, 30B) or along longitudinal axis 180 extending from the central longitudinal axis 150. In some embodiments, these pathways can define a pair of arcuate channels 182 terminating at a central radius 184.

The plastic container 10 of the present disclosure is a blow molded, biaxially oriented container with a unitary construction from a single or multi-layer material. A well-known stretch-molding, heat-setting process for making the one-piece plastic container 10 generally involves the manufacture of a preform (not shown) of a polyester material, such as polyethylene terephthalate (PET), having a shape well known to those skilled in the art similar to a test-tube with a generally cylindrical cross section. An exemplary method of manufacturing the plastic container 10 will be described in greater detail later.

Referring to FIG. 32, exemplary embodiments of a mold system 306 for blow molding the container 10 is illustrated. The mold system 306 can be employed for the manufacture of container geometries, namely base geometries, that could not be previously made. As illustrated in FIG. 32, in some embodiments, the mold system 306 can comprise a base system 310 disposed in operably connection with a sidewall system 320. Base system 310 can be configured for forming generally an entire portion of base portion 28 of container 10 and extends radially and upward until a transition to sidewall portion 24. Base system 310, in some embodiments, can maintain a temperature that is different from sidewall system 320—either hotter or colder than sidewall system 320. This can facilitate formation of container 10 to speed up or slow down the relative formation of the base portion 28 of container 10 during molding.

In some embodiments, base system 310 can comprise a lower pressure cylinder to extend and retract a push up member 323 (shown in phantom in FIG. 32). The push up member 32 can be used to extend or otherwise stretch central pushup 140 axially toward the interior of the container 10. As seen in FIG. 32, push up member 322 can be centrally disposed in base system 310. Also, the push up member 322 can have a retracted position, wherein the push up member 322 is close to flush with surrounding portions of the base system 310, and an extended position (shown in phantom), wherein the push up member 322 can extend away from surrounding portions of the base system 310. In the extended position, the push up member 322 can engage the preform during forming and urge preform upward (e.g. inwardly) to form central pushup 140. Also, following formation of central pushup 140, push up member 322 can be retracted to permit demolding of the final container 10 from the mold. In some additional embodiments, push up member 322 of base system 310 can be paired with a counter stretch rod, if desired.

An exemplary blow molding method of forming the container 10 will now be described. A preform version of container 10 includes a support ring, which may be used to carry or orient the preform through and at various stages of manufacture. For example, the preform may be carried by the support ring, the support ring may be used to aid in positioning the preform in a mold cavity 321 (FIG. 32), or the support ring may be used to carry an intermediate container once molded. At the outset, the preform may be placed into the mold cavity 321 such that the support ring is captured at an upper end of the mold cavity 321. In general, the mold cavity has an interior surface corresponding to a desired outer profile of the blown container. More specifically, the mold cavity according to the present teachings defines a body forming region, an optional moil forming region and an optional opening forming region. Once the resultant structure (hereinafter referred to as an intermediate container) has been formed, any moil created by the moil forming region may be severed and discarded. It should be appreciated that the use of a moil forming region and/or opening forming region are not necessarily in all forming methods.

In one example, a machine (not illustrated) places the preform heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). A stretch rod apparatus (not illustrated) stretches or extends the heated preform within the mold cavity to a length approximately that of the intermediate container thereby molecularly orienting the polyester material in an axial direction generally corresponding with the central longitudinal axis of the container 10. While the stretch rod extends the preform, air having a pressure between 300 PSI to 600 PSI (2.07 MPa to 4.14 MPa) assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized air holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

Alternatively, other manufacturing methods, such as for example, extrusion blow molding, one step injection stretch blow molding and injection blow molding, using other conventional materials including, for example, high density polyethylene, polypropylene, polyethylene naphthalate (PEN), a PET/PEN blend or copolymer, and various multi-layer structures may be suitable for the manufacture of plastic container 10. Those having ordinary skill in the art will readily know and understand plastic container manufacturing method alternatives.

With additional reference to FIGS. 40-45, the container 10 is illustrated as a generally round container with a generally round base 30. Although the container 10 and the base 30 are generally illustrated in FIGS. 40-45 as being round, the container 10 and the base 30 can have any suitable shape or size. For example, the container 10 can have any of the shapes described and/or illustrated above, including, but not limited to, the following: rectangular, triangular, pentagonal, hexagonal, octagonal, polygonal, or square.

Figure 40:
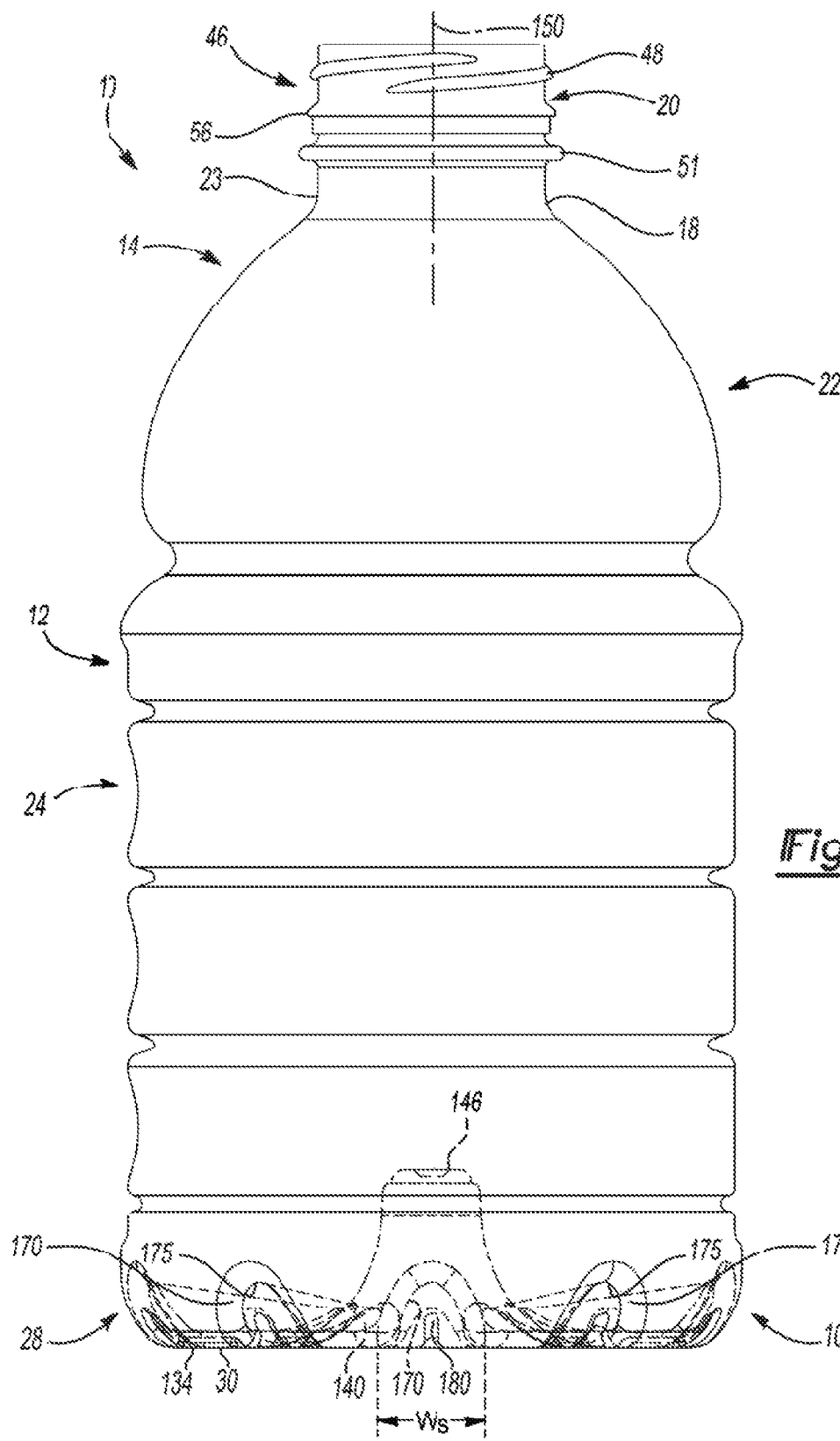
Figure 41:
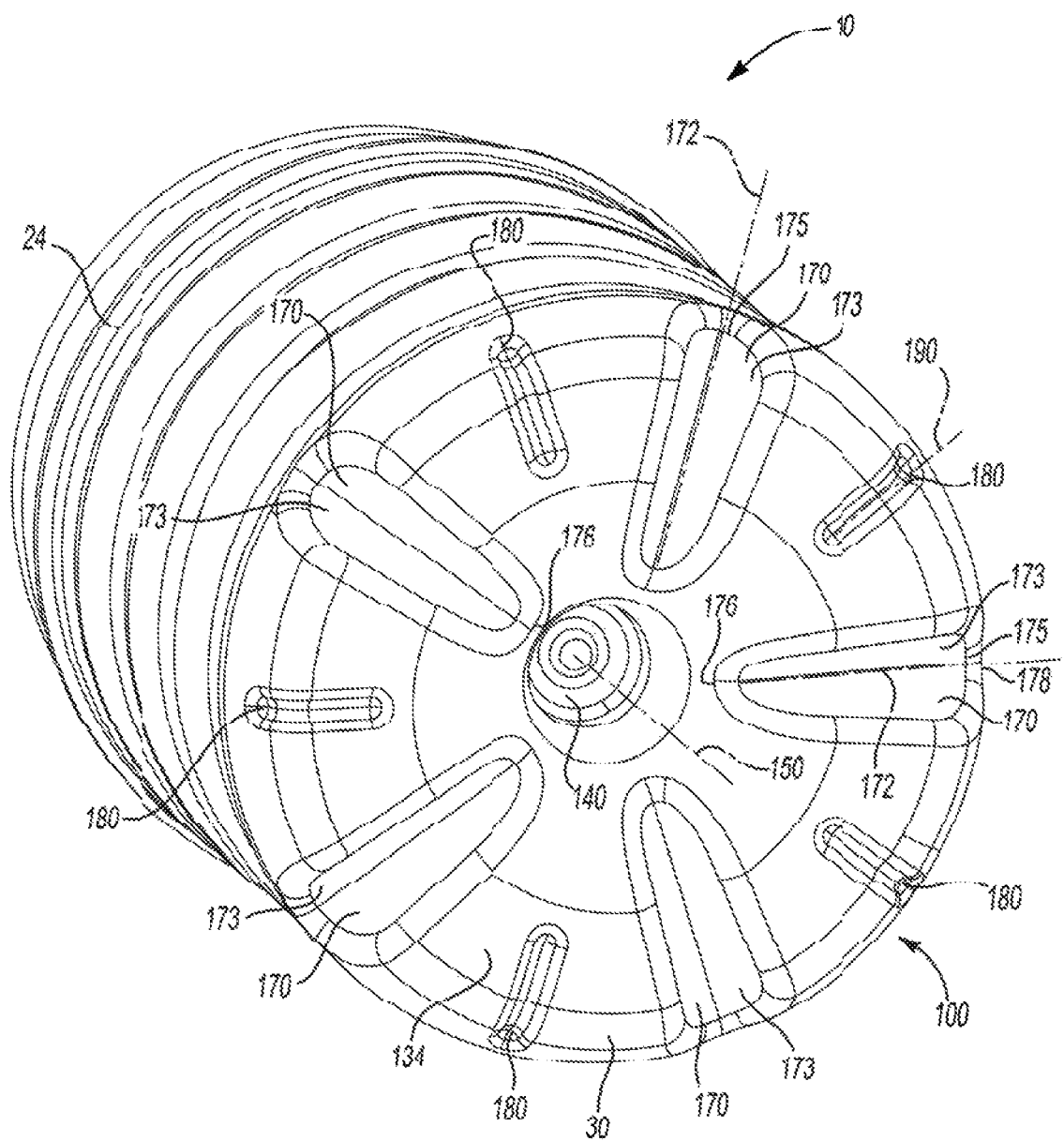

The base 30 includes lightweight base configuration 100, which generally includes straps 170, central pushup portion 140, and ribs 180. The straps 170 extend generally radially from the central longitudinal axis 150 away from the central pushup portion 140 to the sidewall portion 124. Each one of the straps 170 is spaced apart about the base 30. The straps 170 can be spaced apart at any suitable interval, such as a generally uniform interval as illustrated in FIGS. 40-42, for example. Any suitable number of the straps 170 can be included, such as five as illustrated or seven. Generally, the greater the diameter of the base 30, the more straps 170 that can be included.

Each one of the straps 170 extends along the strap plane/axis 172 thereof and is thus an elongated strap. The straps 170 are illustrated as each having a width that generally increases along a length thereof, such that each strap is widest at the sidewall portion 24 and most narrow proximate to the central longitudinal axis 150. In other words, the strap surface 173 extends further from either side of the strap plane/axis 172 at the sidewall portion 24 as compared to proximate to the central longitudinal axis 150.

Each strap 170 generally includes a first end 176 and a second end 178, which are at opposite ends of each strap 170 along the strap plane/axis 172 thereof. The first end 176 is proximate to the longitudinal axis 150 and the second end is at the sidewall portion 24. Each strap 170 extends linearly from the first end 176 to the second end 178, such as linearly along the strap plane/axis 172 extending along the strap surface 173 from the first end 176 to the second end 178 at the peak 175. Each strap 170 is generally inclined along the strap plane/axis 172 thereof from the first end 176 to the second end 178, such that the first end 176 is generally at the contact surface/foot surface 134 of the base 30 and the second end 178 is at the peak 175. Therefore, the second end 178 is further recessed into the base 30 as compared to the first end 176, which may not be recessed into the base 30 at all. Although the straps 170 are illustrated as generally being inclined or sloped in this manner, the straps 170 need not be inclined, and thus the strap plane/axis 172 may extend linearly such that the strap plane/axis 172 is perpendicular to, or substantially perpendicular to, the central longitudinal axis 150 along its entire length or a substantial portion thereof.

The base 30 further includes a plurality of the ribs 180, which as illustrated in the container 10 of FIGS. 40-45 are spaced apart from the straps 170. Each rib 180 is generally elongated and extends generally radially from the central longitudinal axis 150 along a rib longitudinal axis 190 of each rib 180. Each rib 180 extends to the sidewall portion 24 from any suitable position along the base 30 between the central longitudinal axis 150 and the sidewall 30. One or more of the ribs 180 can be between two of the straps 170. For example and as illustrated, only one of the ribs 180 can be between two of the straps 170, and can be equidistant between the two straps 170. Any suitable number of ribs 180 can be included, such as five as illustrated. The number of ribs 180 can generally correspond to the number of straps 170, such that a single rib 180 is between two of the straps 170.

With reference to FIG. 43, the straps 170 extend linearly and are angled such that relative to a base surface 192 that the container 10 may be seated upon, at the inclined strap plane/axis 172 the strap surface 173 is at an angle α from the surface 192. The angle α can be any suitable angle such as, for example, from about 0° to about 30°, from about 5° to about 20°, about 10°, or 10°. With respect to the central longitudinal axis 150, the straps 170 can be arranged at an angle β, which is measured between the central longitudinal axis 150 and the inclined strap plane/axis 172. The angle β can be any suitable angle, such as in the range of about 0° to about 90°, about 45° to about 85°, about 80°, or 80°.

With continued reference to FIG. 43, the central pushup portion 140 includes a top offset surface 194 at the top surface 146 and a bottom offset surface 196 opposite to the top offset surface 194. The top offset surface 194 is recessed within the top surface 146, and the bottom offset surface 196 protrudes from a bottom surface 200 of the central pushup portion 140, which is opposite to the top surface 146. The central pushup portion 140 further includes a flange 198 defined by the side surfaces 148 of the central pushup portion 140. The side surfaces 148 are illustrated as generally curving away from the central longitudinal axis 150, but can have any other suitable shape or configuration as described above, such as in conjunction with FIG. 34, which illustrates side surfaces 148 having concave, convex, and generally planar surfaces.

With reference to FIGS. 44 and 45, the lightweight base configuration 100 is configured to move, such as by flexing, in a variety of different directions in order to enhance durability, structural integrity, resistance to undesirable deformation, and usefulness of the container 10, such as when the container 10 is subject to increased vacuum pressures during cooling of hot filled contents thereof. For example and as illustrated in FIG. 44, the central pushup portion 140 is configured to move along the central longitudinal axis 150, and remain centered on the central longitudinal axis 150 as the central pushup portion 140 moves along the central longitudinal axis 150. The central pushup portion 140 is arranged such that the central longitudinal axis 150 extends through the top offset surface 194, the bottom offset surface 196, and generally an axial center of the top surface 146.

As illustrated in FIG. 44, the central pushup portion 140 can flex along the central longitudinal axis 150 towards the finish 20 to position 140', with the side surface 148 flexing to 148'. As the central pushup portion 140 flexes along the central longitudinal axis 150 towards the finish 20, the straps 170 also flex towards the finish 20, such as to the position at 170' of FIG. 44. Relative to a line 210 extending from about the outward strap radius 202 parallel to base surface 192 that container 10 may be seated on, and perpendicular to axis 150, the straps 170 flex across an angle α up to the line 210 and flex across angle β up and away from the line 210. The angles α and β are the same or generally the same.

As the straps 170 move to the position at 170', an outward strap radius 202 will generally decrease and move to position 202'. The outward strap radius 202/202' is generally measured at the smallest radius where the straps 170 transition to the sidewall portion 24 at an interior of the container 10. As illustrated in FIG. 46, as the volume displaced of the container 10 increases, the outward strap radius 202 generally decreases to 202'. At 3% volume displaced, for example, the outward strap radius 202 generally decreases from about 10% to about 40%, such as 25% or about 25% of the original; or to within a range of about 0.9 times to about 0.6 times the original, such as 0.75 times or about 0.75 times the original. The degree to which the outward strap radius 202 decreases will depend on the size and the composition of the container 10, as well as on the contents thereof and the number of straps 170 present. For example, the greater the number of straps 170 present, the more that the outward strap radius 202 will decrease.

With reference to FIG. 45, as the central pushup portion 140 moves along the central longitudinal axis 150 towards the finish 20, a base clearance Cb will increase a distance Cb', thereby making the overall base clearance Cb+Cb'. With respect to FIG. 47 for example, as the volume displaced percentage increases, the distance Cb' will also increase. At 3% volume displaced for example, the base clearance will increase anywhere from about 3 mm to about 7 mm. In other words, the distance Cb' will increase to within a range of from about 3 mm to about 7 mm. The distance that the base clearance increases, which is identified in FIG. 45 as Cb', depends on the size and the composition of the container 10, as well as on the contents thereof and the number of straps 170 present. For example, the greater the number of straps 170 present, the more that the base clearance will increase, and the greater that the distance Cb' will be.

As also illustrated in FIG. 45, as the central pushup portion 140 moves towards the finish 20, the contact/foot surface 134 moves towards the finish 20 to position 134', thus decreasing standing base radius Rsb to Rsb'. The standing base radius is generally measured from the central longitudinal axis 150 to a point where the contact/foot surface 134 makes contact with surface 192. With reference to FIG. 48, as the volume displaced percentage increases, the standing base radius will generally decrease from Rsb to Rsb'. At 3% volume displacement, for example, the standing base radius will generally decrease to Rsb' within a range of from about 28 mm to about 40 mm. Again, the distance that the standing base radius decreases will depend on the size and composition of the container, the contents thereof, and the number of straps 170 present.

Figure 1:
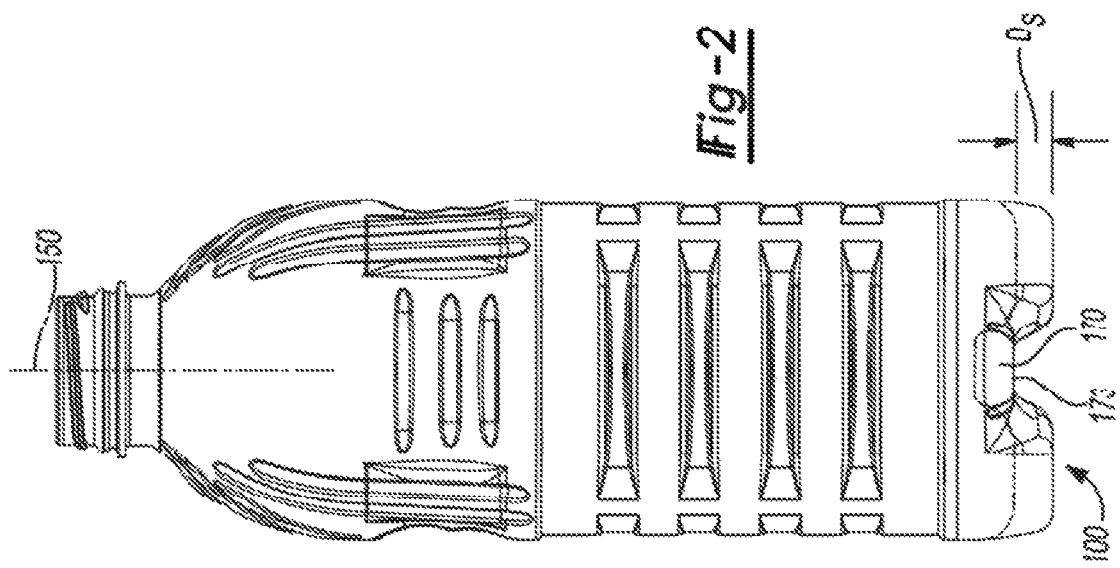
Figure 2:
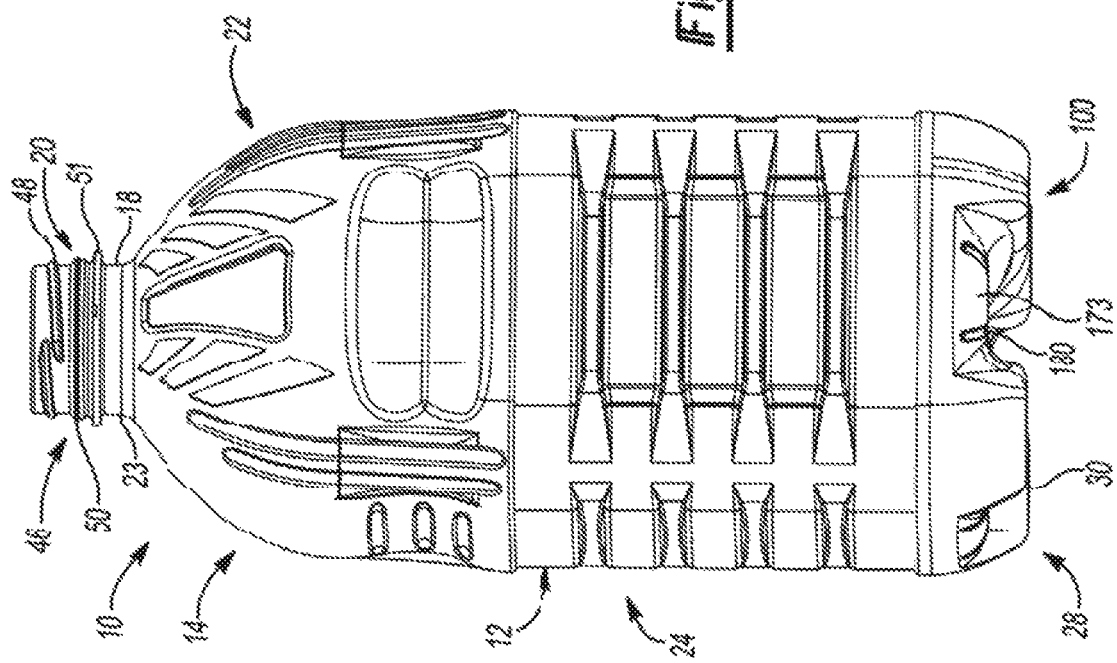

With reference to FIG. 49, as the volume displaced of the container 10 increases and the side surface 148 flexes to 148' as illustrated in FIG. 45, an inward foot radius 149 of the base configuration 100 increases as measured at about a midway point along the curved side surface 148. At 3% volume displacement, for example, the inward foot radius can increase about 1.1 times to about 2.0 times the original before displacement, such as 1.5 times or about 1.5 times the original. The decrease in the outward strap radius and the increase in the inward foot radius are directly proportional. For example, the inward foot radius increases a distance that is about 1.2 times to about 3.3 times, or about 2 times, the distance that the outward strap radius decreases. Thus, if the inward foot radius increases about 2 times the distance that outward strap radius decreases, then the outward strap radius will decrease 10% or about 10%, and the inward foot radius will increase 20% or about 20%. Any suitable relationship can be established between the outward (or outer) strap radius and the inward (or inner) foot radius. With reference to FIG. 1 for example, the relationship between the outward strap radius and the inward foot radius can be set at any point in the illustrated box.

As the volume displaced of the container increases, the width Ws of each strap 170 (see FIG. 40 for example), decreases. The width can be measured between any suitable points of each strap 170. For example, the width of each strap 170 can be measured between two points that are on opposite sides of the strap plane/axis 172, furthest from the longitudinal axis 150, and configured to rest on planar base surface 192 when the container 20 is seated on the planar surface 192. As the width Ws of each strap 170 decreases, the feet 134 between the straps 170 move closer together, thus decreasing a foot separation distance between the feet 134. With reference to FIG. 50, as the volume displaced increases, the foot separation distance also decreases. At a volume displacement of about 3%, the foot separation distance will decrease about 5% to about 20%, such as about 10% to about 17%, such as about 12.5%. The width Ws of the straps 170 is effectively the separation distance between the straps 170, and thus the width Ws of the straps 170 will decrease the same amount as the separation distance.

With additional reference to FIGS. 52A-52D, another configuration of the container 10 according to the present teachings is illustrated. FIG. 52A illustrates the container 10 in an as-blown, pre-filled configuration. FIG. 52B illustrates the container 10 after being hot-filled and subsequently cooled, with the as-blown position shown at AB. FIG. 52C illustrates the container 10 subject to top load pressure, with the as-blown position shown at AB. FIG. 52D illustrates the container 10 subject to additional top load pressure, with the as-blown position shown at AB. The container 10 of FIGS. 52A-52D includes the generally round base portion 30 and the light base configuration 100 described above. Thus, the container 10 of FIGS. 52A-52D includes the straps 170 and the central pushup portion 140, and may include the ribs 180 as well.

The main body portion 12 includes the sidewall 24, which extends to the base portion 30 of the container 10. The sidewall 24 defines an internal volume 326 of the container 10 at an interior surface thereof. The sidewall 24 may be tapered inward towards the longitudinal axis 150 at one or more areas of the sidewall 24 in order to define recesses or ribs 350 at an exterior surface of the sidewall 32, as well as an inwardly tapered portion 352 between the ribs 350 and the shoulder portion 22. As illustrated, the sidewall 24 defines five recesses or ribs 350a-350e. However, any suitable number of recesses or ribs 350 can be defined. The ribs 350 can have any suitable external diameter, which may vary amongst the different ribs 350.

In response to an internal vacuum, the ribs 350 can articulate about the sidewall 24 to arrive at a vacuum absorbed position, as illustrated in FIG. 52B for example. Thus, the ribs 350 can be vacuum ribs. The ribs 350 can also provide the container 10 with reinforcement features, thereby providing the container 10 with improved structural integrity and stability. Larger ribs, such as rib 350a which has a larger vertical height and is recessed deeper in the sidewall 24 relative to other ribs 350, will have a greater vacuum response. Smaller ribs, such as ribs 350b, 350c, and 350e, will provide the container with improved structural integrity.

The combination of base portion 30, which as described above is a vacuum base portion 30, and the horizontal ribs 350 allows the container 10 to reach a state of hydraulic charge up when a top load force is applied after the container 10 is filled, as illustrated in FIGS. 52C and 52D for example, which allows the container 10 to maintain its basic shape. This movement of the base portion 30 caused by top load force is constrained by the standing surface, and the horizontal ribs 350 begin to collapse, thereby causing filled internal fluid to approach an incompressible state. At this point, the internal fluid resists further compression and the container 10 behaves similar to a hydraulic cylinder, while maintaining the basic shape of the container 10.

More specifically, in the as-blown, prefilled configuration AB of FIG. 52A, the container 10 stands upright while resting on diaphragm 354, and volume and pressure are zero or generally zero, thereby providing the container 10 in phase 1. FIG. 53 is a graph of base volume change versus pressure, and FIG. 54 is a graph of filled, capped, and cooled top load versus displacement of an exemplary container 10 according to the present teachings. The various phases described herein are illustrated in FIGS. 53 and 54.

With reference to FIG. 52B, after the container 10 is hot-filled and cooled, the base portion 30 is pulled up towards an upper end 356 of the container 10 due to internal vacuum. The upper end 356 is at the finish 20 and is opposite to a lower end 358 of the container 10 at the base portion 30. Overall height of the container 10 is reduced (compare the container 10 in the as-blown position AB), and the container 10 is supported upright at an outer portion (or standing surface) of the base portion 30 to provide the container 10 at phase 2. With reference to FIG. 52C, application of top load urges the base portion 30 to the original as-blown position of FIG. 52A, and the internal vacuum crosses over to positive internal pressure, thereby providing phase 3. FIG. 52D illustrates phase 4 and an increase in top load, which returns the base portion 30 substantially to the original as-blown position of FIG. 52A and phase 1. The base portion 30 is constrained by the standing surface thereof, the ribs 350 collapse causing further reduction in internal volume of the container 10, and a hydraulic spike in internal pressure advantageously facilitates very high top load capability.

FIGS. 55-57 illustrate pressure-volume characteristics under vacuum and filled capped cooled top load of an exemplary container 10 according to the present teachings. Specifically, FIG. 55 illustrates container volume change versus pressure. FIG. 56 illustrates body volume change versus pressure. FIG. 57 illustrates the base volume change versus pressure. From FIG. 57, it is clear that the base 30 is flexible under vacuum and significantly stiffer under top load, which is a desired characteristic for good vacuum and filled capped cooled top load. FIG. 56 demonstrates that under top load the volume of the body and ribs 350 continuously decreases, leading to increased pressure. The ribs 350 are suitable for allowing displacement to increase as top load increases because the ribs 350 are axially flexible (i.e., can be axially compressed to lead to pressure charge-up) and radially stiff to maintain pressure. Therefore, combination of the base 30 and ribs 350 provides an advantageous configuration for improved vacuum and top load responses.

The features described in conjunction with the container 10 illustrated in FIGS. 52A-52D can be included with any of the containers 10 according to the present teachings. For example, any of the containers 10 described herein can include any suitable number of the ribs 350, such as five ribs 350a-350e. Furthermore, any of the containers 10 according to the present teachings can exhibit the performance characteristics set forth in the graphs at FIGS. 53-57, such as by providing the containers 10 with the ribs 350 and the base portion 30 including the straps 170 and central pushup 140, and optionally the ribs 180.

The containers disclosed in accordance with the present teachings, particularly the bases thereof, can have any suitable dimensions. For example and with reference to FIGS. 58A and 58B, base 30 of lightweight base configuration 100, which is a generally round base, can have a total projected area of foot surface 134/134' that is 2 times greater than the projected surface area of strap surface 170 as illustrated in FIG. 58A. For example, the strap area 410A can have a total projected area of 11.7 cm$^2$. The total projected area of foot area 410B can be 23.8 cm$^2$. In other embodiments shown in FIGS. 60A-60E, the base 30 can have a total projected area of foot surface 134/134' that is 2 to 4.8 times greater than the projected surface area of strap surface 170.

Each one of the straps 170 can extend outwards from the central pushup portion 140 at an angle 412A of about 24°, which provides the base 30 with a total strap angle of 120° (24°×5). The foot area 412B can extend from the central pushup portion 140 at an angle about 48°, which provides the base 30 with a total foot angle of 240° (40°×5). The base 30 thus has a foot angle 412B that is 2 times greater than the strap angle 412A. In other embodiments shown in FIGS. 60A-60E, the base 30 can have a foot angle 412B that is between 2 to 5 times the strap angle 412A.

The base 30 can have a total projected outside perimeter 414A of straps 170 of 76 mm, and a total projected outside perimeter 414B of the feet 134 of 155 mm. Thus the ratio of the total projected outer perimeters 414A and 414B is 1:2. In other embodiments shown in FIGS. 60A-60E, the outer perimeter 414B of the feet 134 can be 0.4 to 3 times the outer perimeter 414A of the straps 170.

With respect to the inner perimeter, the total projected inner perimeter 416A of straps 170 can be 31 mm, and the total projected inside perimeter 416B of the feet 134 can be 63 mm. Thus the ratio of the total projected inside perimeters 416A to 416B is 1:2. In other embodiments shown in FIGS. 60A-60E, total inside perimeter 416B of the feet 134 can be 2 to 3 times greater than the total inside perimeter 416A of the straps 170.

With continued reference to FIG. 58A and additional reference to FIG. 58B, the base 30 can have a strap angle 420 of +5 degrees as measured between an innermost surface of strap 170 and surface 192, which extends perpendicular to central longitudinal axis 150. The base 30 can have a foot angle 430 of −15 degrees, as measured between an innermost surface of inner/contact foot surface 134', and surface 192. The different between the strap angle 420 and the foot angle 430 can be 20°, or within the range of 12° to 27° as show in other embodiments in FIGS. 60A-60E.

With reference to FIGS. 59A and 59B, generally rectangular base 30 can have a total projected strap area 510A of 27.5 cm$^2$, and a total projected foot area 510B of 56.5 cm$^2$. The rectangular base 30 can have strap angles 512A of 43°, and strap angles 512A' of 56°, for a total strap angle of 198° (43°+43°+56°+56°). The rectangular base 30 can have foot angles 512B of 40°, for a total foot angle of 160° (40°×4). Thus the ratio of the total strap angles to total foot angles is 1:8. The generally rectangular base 30 of FIGS. 59A and 59B can have an outer strap perimeter 514A of 147 mm, and an outer foot perimeter 514B of 218 mm. Thus the ratio of the outer strap perimeter 514A to outer foot perimeter 514B is 1:1.5. The rectangular base 30 can have a rectangular inner strap perimeter 516A of 37 mm, and an inner foot perimeter 516B of 95 mm. Thus the ratio of the inner strap perimeter 516A to inner foot perimeter 516B can be 2:5. The rectangular base 30 can have a strap angle 520 of +7° (FIG. 59B), and a foot angle 530 of −5° (FIG. 59C). The difference between the strap angle 520 and the foot angle 530 can be 12°. With reference to FIG. 59D, pushup major diameter 550 can be 40% to 50% greater than pushup minor diameter.

For both the round base 30 of FIGS. 58A and 58B, and the generally rectangular base 30 of FIGS. 59A-59D, the foot angle range (430, 530) is −4° to −15°. The strap angle range (420, 520) is +5° to +23°. The delta range of the axial strap to foot angle relationship is 12°-27°.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A container defining a longitudinal axis and a transverse direction that is transverse with respect to the longitudinal axis, the container comprising:
   a finish;
   a sidewall portion extending from the finish;
   a plurality of ribs defined by the sidewall portion;
   a base portion extending from the sidewall portion and enclosing the sidewall portion to form a volume therein for retaining a commodity, the base portion having a plurality of footed contact surfaces for supporting the container; and
   a plurality of straps extending radially along the base portion away from the longitudinal axis in the transverse direction, each one of the straps defining a strap surface that is closer to the finish than the plurality of footed contact surfaces;
   wherein:
      the plurality of ribs and the base portion are configured to cause the container to cross over from a vacuum phase to a phase of hydraulic charge-up when top load is applied to the container after the container is filled and closed with a closure coupled to the finish;
      the container is made of a polymeric material;
      the base portion includes a central pushup portion at an axial center thereof, the longitudinal axis extends through the central pushup portion;
      an outward strap radius defined by the base portion as-blown decreases when the container is subject to volume displacement post-fill causing increased vacuum;
      an inward foot radius defined by the base portion as-blown increases when the container is subject to volume displacement post-fill causing increased vacuum, the inward foot radius is inward relative to the plurality of footed contact surfaces of the container and is along a curved side surface between the plurality of footed contact surfaces and the central pushup portion;
      a standing base radius defined by the base portion as-blown decreases when the container is subject to volume displacement post-fill causing increased vacuum; and
      a total projected area of the plurality of footed contact surfaces as-blown is at least twice the size of a total projected area of the plurality of straps.

2. The container of claim 1, wherein the total projected area of the plurality of footed contact surfaces is 2 to 4.8 times the size of a total projected area of the plurality of straps.

3. The container of claim 1, wherein:
   the base portion is round and each one of the plurality of straps is angled +5° to +23° relative to a planar surface for supporting the container upright in an as-blown, pre-filled configuration of the container; and
   each one of the plurality of footed contact surfaces is angled −4° to −15° relative to the planar surface for supporting the container upright in an as-blown, pre-filled configuration of the container.

4. The container of claim 1, wherein the base portion is round and the plurality of footed contact surfaces extend outward from the central pushup portion at a total angle that is at least twice as large as a total angle that the plurality of straps extend outward from the central pushup portion.

5. The container of claim 4, wherein the plurality of footed contact surfaces extend outward from the central pushup portion at a total angle that is 2 to 5 times as large as a total angle that the plurality of straps extend outward from the central pushup portion.

6. The container of claim 1, wherein the plurality of footed contact surfaces has a total outer perimeter that is 0.4 to 3 times the size of a total outer perimeter of the plurality of straps.

7. The container of claim 1, wherein the plurality of footed contact surfaces has an inner perimeter that is 2 to 3 times the size of an inner perimeter of the plurality of straps.

8. The container of claim 1, wherein:
   at least one of the plurality of footed contact surfaces is angled in a range of −4° to −15° relative to a planar surface for supporting the container upright in an as-blown, pre-filled configuration of the container; and at least one of the plurality of straps is angled in a range of +5° to +23° relative to a planar surface for supporting the container upright in an as-blown, pre-filled configuration of the container.

* * * * *